United States Patent [19]
Lockie et al.

[11] Patent Number: 5,642,122
[45] Date of Patent: Jun. 24, 1997

[54] SPACECRAFT ANTENNAS AND BEAM STEERING METHODS FOR SATELLITE COMMUNCIATION SYSTEM

[75] Inventors: Douglas Gene Lockie, Monte Sereno; Mark Thomson, Ventura, both of Calif.

[73] Assignee: Teledesic Corporation, Kirkland, Wash.

[21] Appl. No.: 241,103

[22] Filed: May 11, 1994

Related U.S. Application Data

[63] Continuation-in-part of Ser. No. 967,988, Oct. 28, 1992, abandoned, which is a continuation-in-part of Ser. No. 790,271, Nov. 8, 1991, abandoned.

[51] Int. Cl.$^6$ ........................................ H01Q 1/08
[52] U.S. Cl. ........................... 343/881; 343/DIG. 2
[58] Field of Search ................... 343/853, 915, 343/881, DIG. 2, 878; H01Q 1/08, 1/12

[56] References Cited

U.S. PATENT DOCUMENTS

| | | | |
|---|---|---|---|
| 3,699,581 | 10/1972 | Hall et al. | 343/915 |
| 3,717,879 | 2/1973 | Ganssle | 343/915 |
| 4,315,265 | 2/1982 | Palmer et al. | 343/915 |
| 4,896,165 | 1/1990 | Koizumi | 343/915 |

OTHER PUBLICATIONS

"Multibeam Array Antenna For Data Relay Satellite," T. Teshirogi et al., *Electronics & Communications in Japan*, May 1988, pp. 71–85.

"Inmarsat Second Generation Satellites For Maritime Communications," E. Gambaruto, *Oceans '89*, Sep. 1989, pp. 920–925.

"A 20/30 GHz Personal Access Satellite System Design," P. Estabrook et al., *IEEE International Conference on Communications*, Jun. '89, pp. 216–222.

"Phased Array Antennas With Phasers and True Time Delay Phase Shifters," N.V. Jespersen et al., 1990 *Int'l Symposium Digest*, May 1990, pp. 778–781.

"A Metropolitan Area Radio System Using Scanning Pencil Beams," A. Acampora et al., *IEEE Transactions on Communications*, Jan. 1991, pp. 141–151.

"Beamforming Devices and Feed Structures for a DBS Flat-Plate Antenna," S. Wakeling, BBC Research Dept. Report No. 12, 1989, pp. 1–12.

European Patent Application No. 90310760.5, 2 Oct. 1990, B.R. Bertiger et al.

*Primary Examiner*—Michael C. Wimer
*Attorney, Agent, or Firm*—Anglin & Giaccherini

[57] ABSTRACT

An advanced active element phased array satellite antenna is disclosed. Incorporating these novel antenna systems on a constellation of low Earth orbit spacecraft, allows phone customers worldwide to communicate through a system whose switching intelligence resides on orbit, bypassing traditional land-based networks, and offering a revolutionary expansion of communications potential. The present invention utilizes electronic beam steering is utilized to provide extremely high gain signals. In one preferred embodiment, a satellite (S) includes an Earth-facing array (10) of hexagonal antenna facets (12), mated together along their sides to form a slightly flattened, hemispherical shell. The antenna array (10) is connected to two rectilinear, unfurled, solar panels (P). The antennas (10) transmit and receive signals from terrestrial units located within the footprints (14) of the beams (11). Another embodiment (34) uses deployable, folding panels (41) which maximize panel surface area for a given weight and launch vehicle container volume. The panels (41) are stacked upon a central plate (39) along the depth axis of the container in accordion fold layers and are separately deployed radially from the center (C) of the central plate (39). The contour of the deployed panels permit the antenna beam footprints (14) to cover the desired area.

10 Claims, 31 Drawing Sheets

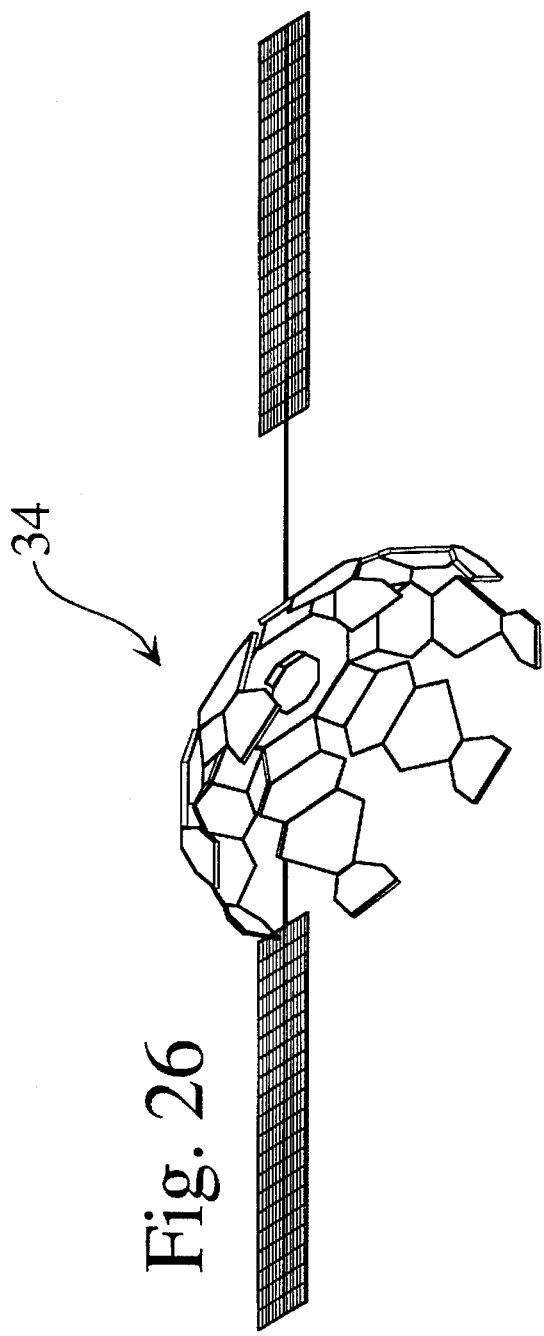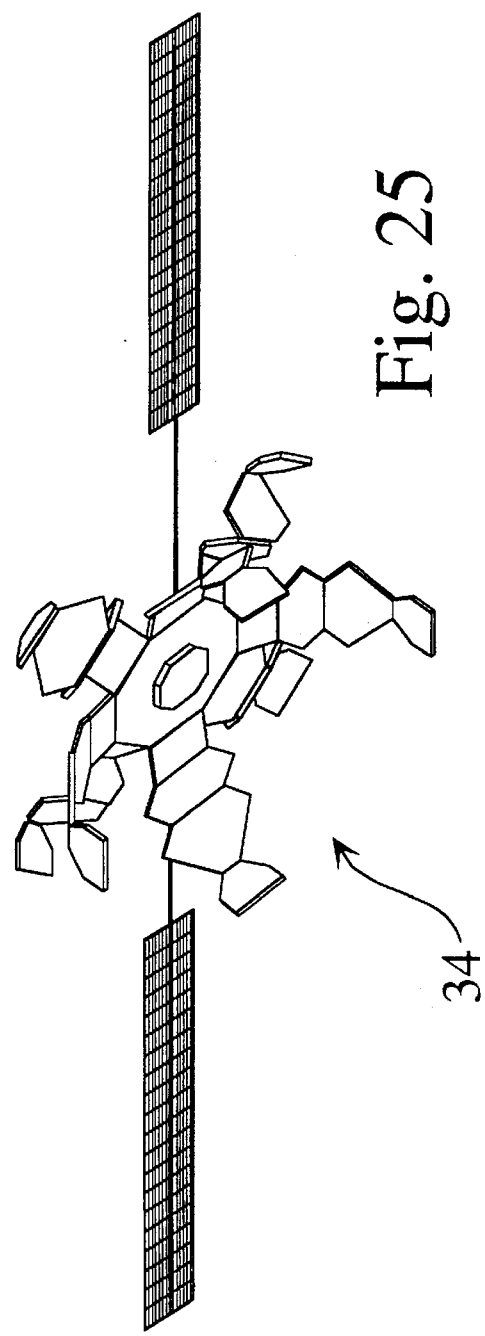
Fig. 26
Fig. 25

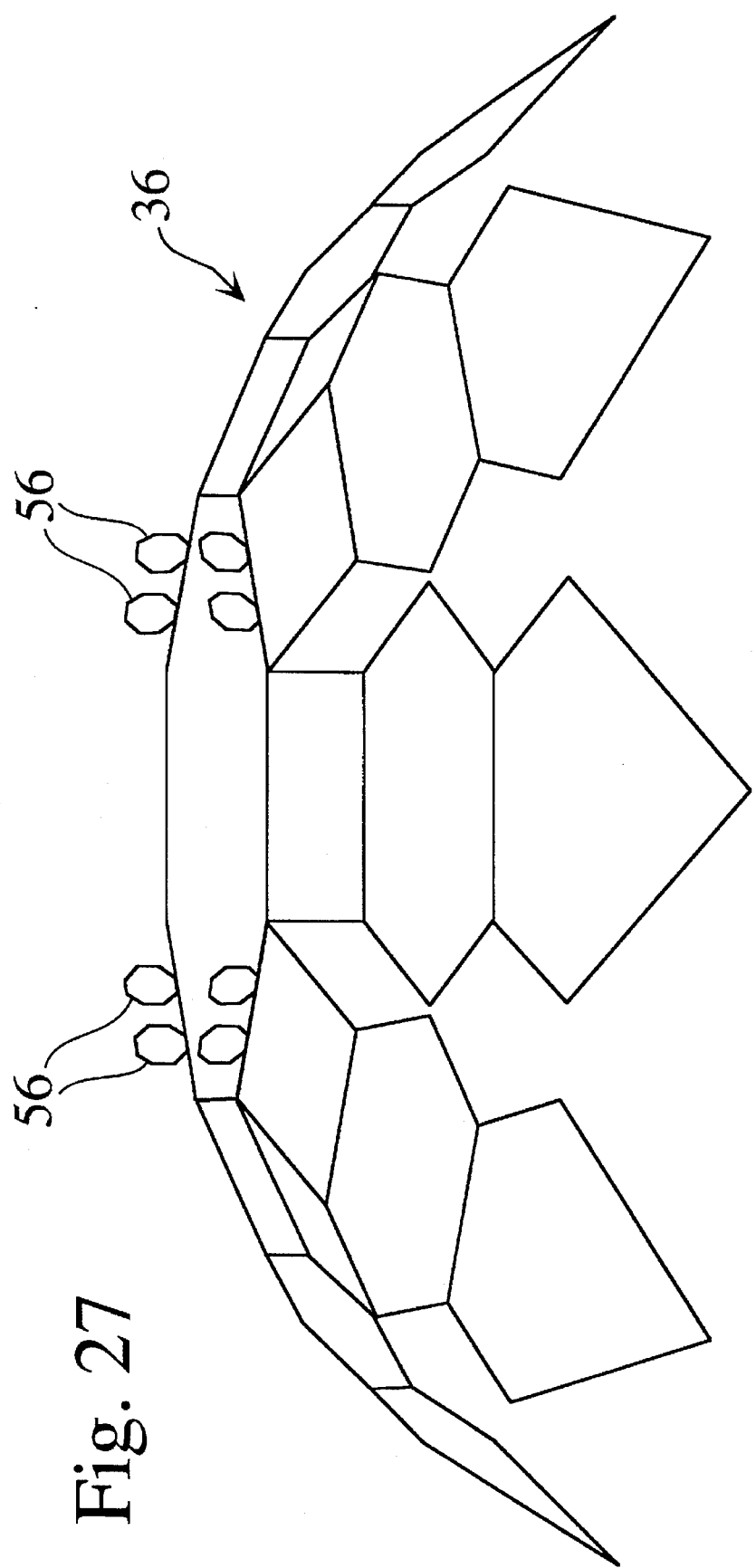

1

SPACECRAFT ANTENNAS AND BEAM STEERING METHODS FOR SATELLITE COMMUNCIATION SYSTEM

CROSS-REFERENCES TO RELATED PATENT APPLICATIONS

The present application is a Continuation in Part application. The Applicants hereby claim the benefit of priority under Section 120 of Title 35 of the United States Code of Laws for any and all subject matter which is commonly disclosed in the present application and in pending patent application entitled *Spacecraft Antennas & Beam Steering Methods for Satellite Communication System* by Douglas Gene Lockie, filed 28 Oct. 1992 and assigned U.S. Ser. No. 07/967,988, now abandoned, which itself is a Continuation-in-Part of patent application *Spacecraft Antennas & Beam Steering Methods for Satellite Communication System* by Douglas Gone Lockie, filed on 08 Nov. 1991 and assigned U.S. Ser. No. 07/790,271, now abandoned. The Applicants also hereby claim the benefit of priority under Section 120 of Title 35 of the United States Code of Laws for any and all subject matter which is commonly disclosed in the present application and in pending patent application entitled *Intersatellite Link for Satellite Communication System* by Douglas G. Lockie et al., filed on 16 Jul. 1992 and assigned U.S. Ser. No. 07/915,172, now abandoned.

FIELD OF THE INVENTION

The present invention relates to the field of satellite communications. More particularly, this invention provides an advanced, active element, phased array satellite antenna system which provides extremely high gain, and which also uses the available spectrum with great efficiency. The power supplied by the invention enables telephone users on the ground to communicate directly with a constellation of spacecraft in low Earth orbit using a compact, hand-held terminal which does not pose radiation hazards.

BACKGROUND OF THE INVENTION

Existing public phone systems rely primarily on land lines and microwave repeaters to handle call traffic. Recent expansions of cellular networks have enhanced phone service by providing access to the land based system for customers using mobile phones in their vehicles or hand-held portable units. The increased capacity offered to the subscriber is relatively small compared to the number of subscribers using conventional fixed phones, since cellular service is limited to only those geographical regions that are densely populated. Cellular communication is often afflicted by poor performance when customers travel from one cell to another, or when they traverse the radio shadows projected by terrain or buildings.

One previous attempt to bypass the limits of conventional communications networks utilizes a transportable telephone that employs a satellite dish several feet in diameter to communicate directly with satellites in 22,300 mile geostationary orbits. The transponders on board these satellites then connect the caller directly to the land-based system, which directs their call through switches on the ground. These devices are heavy, difficult to transport, and are prohibitively expensive.

Public phone companies do not currently offer continuous world-wide service to subscribers using a mobile or portable phone without the use of costly and large antenna systems. Commercial spacecraft and transponders that are presently on orbit do not generally possess the power capacity to communicate directly with terminals that are not coupled to an antenna dish that is at least a few feet in diameter. The service which is available is extremely limited and too expensive for use by all but a few.

An alternative to the large ground-based satellite dish is a large antenna array mounted on surfaces which are deployed from the spacecraft or satellite. Appropriate frequencies and sufficient gain in a low Earth orbit space-borne antenna would eliminate the need for a large, high-gain dish on the ground, thereby opening the way for a much lower gain antenna that can be carried by a mobile unit or by a person on a hand-held unit. Large, stowable surfaces for supporting a very high gain phased array of antenna elements, which can be accurately positioned on deployment have, until now, been unavailable.

In recent years there have been several developments in the field of deployable antenna array systems for achieving communications with Earth-based stations.

In U.S. Pat. No. 5,017,925, Bertiger et al. disclose a multiple beam space antenna system for facilitating Earth communications between a satellite switch and a plurality of Earth-based stations. The antenna is deployed after the satellite is in orbit by inflation of a raft-type supporting structure which contains a number of antenna horns. The antenna horns are mounted in concentric circular groups about a centrally located antenna horn. Each of the antenna beams projects an area on the Earth. Each of the areas of the beams are contiguous. As a result, one large area is subdivided into many smaller areas to facilitate communications. A lens may be employed to focus the antenna beams emanating from the horn antennas.

Spring et al., U.S. Pat. No. 4,901,085, discloses a communications satellite which uses a low level beam forming network connected to a hybrid matrix power amplifier section which has output ports connected to an array of radiating elements. Several beams emanate from the array and at least some of the elements are used in common for more than one beam to achieve beam overlap. Such a multibeam antenna provides high gain and frequency reuse capability.

In Scott et al., U.S. Pat. No. 4,335,388, a multibeam antenna is disclosed which produces a null at one or more specified points with greater frequency band width for a given null depth. An antenna assembly in accordance with an embodiment of this disclosure has a phase rotation means coupled to the antenna elements to adjust the phase of a signal applied to each of the antenna elements. Phase rotation nulling is used such that a narrow beam at a null point can be turned off. Thus, radiation pattern null shaping provides a null in a specified composite antenna pattern without materially changing the composite pattern in other directions. Scott et al. aver that generating nulls is advantageous to minimize the deleterious effects of discrete sources of interfering radiation which impinge on the antenna aperture while the antenna provides radio communications in other directions. In some satellite communications it may be desirable to aim a null at a jamming source while maintaining coverage of the antenna beam pattern in other angular directions.

Chen, U.S. Pat. No. 5,162,803, discloses a combination of doubly folded parallel plate beam combiners or dividers, configured to produce a desired composite beam form used in arrays of antenna elements. The doubly folded combiner or divider functions to expand a transmitted beam, or contract a received beam, in one selected plane. Use is made of a beam forming structure of this type in conjunction with an array of transmit/receive microwave modules providing amplification and phase shifting functions, and an array of printed circuit antenna elements. With appropriate phase shifting controls, a composite beam transmitted or received by the array of antenna elements can be steered independently in azimuth and elevation, using much less complex control circuitry than a conventional phased array antenna system.

Kaminskas, U.S. Pat. No. 4,811,034, discloses a plurality of small segments stowed in a compact stack and assembled, essentially automatically, into a large construction surface such as a flat or parabolic reflector. The construction surface is of a kind having surface segments of essentially identical configuration stacked along a common axis for storage in minimum space and which is assembled side by side to extend over a wide area. Each segment is hinged at a corner and pivots about the hinge to unfold. The pivot-type hinge translates in order to permit one segment to become coplanar with the others at least along one common edge. To achieve a parabolic shape for the deployed segments, the hinge is canted at an angle with respect to the axis of the undeployed stack. In order to create the curved construction surface disclosed by Kaminskas, the individual segments themselves have a curved surface and as a result require a larger volume for stacking than would be required by flat segments. The segments themselves need to be of a thickness imparting rigidity. This adds additional requirements for stowage space. It does not appear that a structure such as Kaminskas' would accommodate the antenna feed lines required for an array of ultra-high frequency (UHF) or extra-high frequency (EHF) antennas that are contemplated for direct communication with mobile or hand-held communicators.

The problem of providing an economically viable network for voice, data, and video which can be used by subscribers all over the world has presented a major challenge to the communications business. The development of a high power satellite system which can transmit and receive radio signals to portable, mobile, and fixed terminals on the land and sea and in the air without the intermediate steps of routing traffic through land-based equipment would constitute a major technological advance and would satisfy a long felt need within the electronics and telephone industries.

SUMMARY OF THE INVENTION

The *Spacecraft Antennas & Beam Steering Methods for Satellite Communication System* comprises an advanced active element phased array antenna. The present invention utilizes electronic beam steering to provide extremely high gain signals. By incorporating these novel antenna systems on a constellation of low Earth orbit spacecraft, phone customers across the globe will be able to communicate through a communication system whose switching intelligence resides on orbit. This unique configuration bypasses traditional land-based networks, and offers a revolutionary expansion of communications potential. The present invention is a vital element of the invention entitled *Satellite Communication System*, which is disclosed in the pending patent application referred to above.

The innovative design of one of the preferred embodiments employs a hemispherical configuration of hexagonal antenna facets fabricated from ultra-light weight honeycomb materials and advanced composites. Gallium-arsenide (GaAs) millimeter wave integrated circuits (MMIC) coupled to each antenna panel handle call traffic. In one embodiment, each antenna simultaneously generates 256 beams which are electronically steered to 4,096 positions on the surface of the Earth. Each individual beam illuminates a region on the ground that measures roughly 20 kilometers by 20 kilometers.

One embodiment of the invention uses a deployable, folding panel apparatus which maximizes panel surface area for a given satellite weight and launch vehicle stowage container diameter and depth. A phased array of antennas is mounted on a plurality of articulated arms, each articulated arm comprising a plurality of panels numbering from one to i. The antennas are initially stacked upon a central plate within a cylindrical stowage container. The central plate is a polygon which has n sides, n being an integer divisible by 2, and a center. In a preferred embodiment, n is 8. The central plate has a first adjacent side and a second adjacent side, with reference to each one of said n sides. The central plate has an obverse face, a reverse face and a planform, peripheral outline determined by inscribing the polygon shape within the inside circumference of the stowage container. The articulated arms are capable of being stowed on either the obverse face or the reverse face of the central plate in an absolute minimum axial distance determined only by the thickness of the panels. When stacked on both sides of the central plate, the articulated arms are the same in number as the number of sides of the central plate.

The panels are stacked upon the central plate along the depth axis of the stowage container in accordion fold layers. Each panel is hinged at the accordion fold where it joins another panel. Each panel has a thickness capable of supporting a plurality of devices including the antenna radiating elements and feedlines.

Each one of the articulated arms is separately deployable in a radial direction from the center of the central plate. The hinges are shaped so they open to a precise, predetermined angle. When the articulated arms are fully deployed, the hinges register to the predetermined angle and the panels assume a desired contour, for example a concave, somewhat flattened hemisphere. The contour of the deployed panels is chosen so that the antenna beam patterns cover the area at the Earth's surface (approximately 1,600,000 km$^2$) described above. In addition to Earth coverage, the deployed panels also provide an antenna platform for an inter-satellite link.

An appreciation of other aims and objectives of the present invention and a more complete and comprehensive understanding of this invention may be achieved by studying the following description of preferred and alternative embodiments and by referring to the accompanying drawings.

A BRIEF DESCRIPTION OF THE DRAWINGS

FIG. 2 also reveals three sets of electronically steered beams produced by the hexagonal antennas and the circular and elliptical footprints which the beams illuminate on the Earth's surface.

Figure 1:
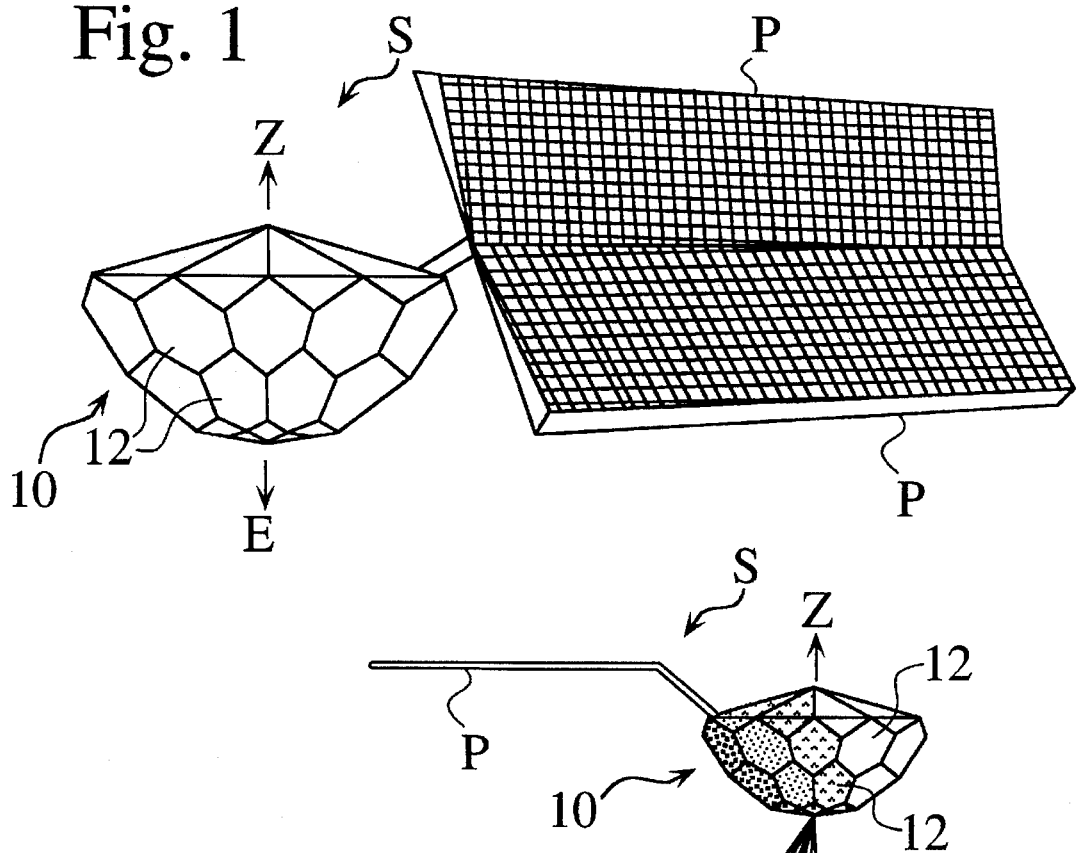
FIG. 1 is perspective view of a satellite that includes a hemispherical array of hexagonal antenna facets and fully extended rectangular solar panels.
Figure 2:
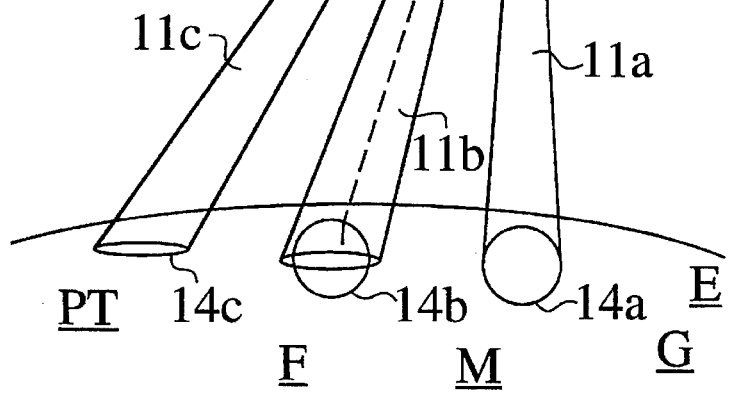
FIG. 2 depicts a schematic diagram of the satellite similar to the one illustrated in FIG. 1.
Figure 3:
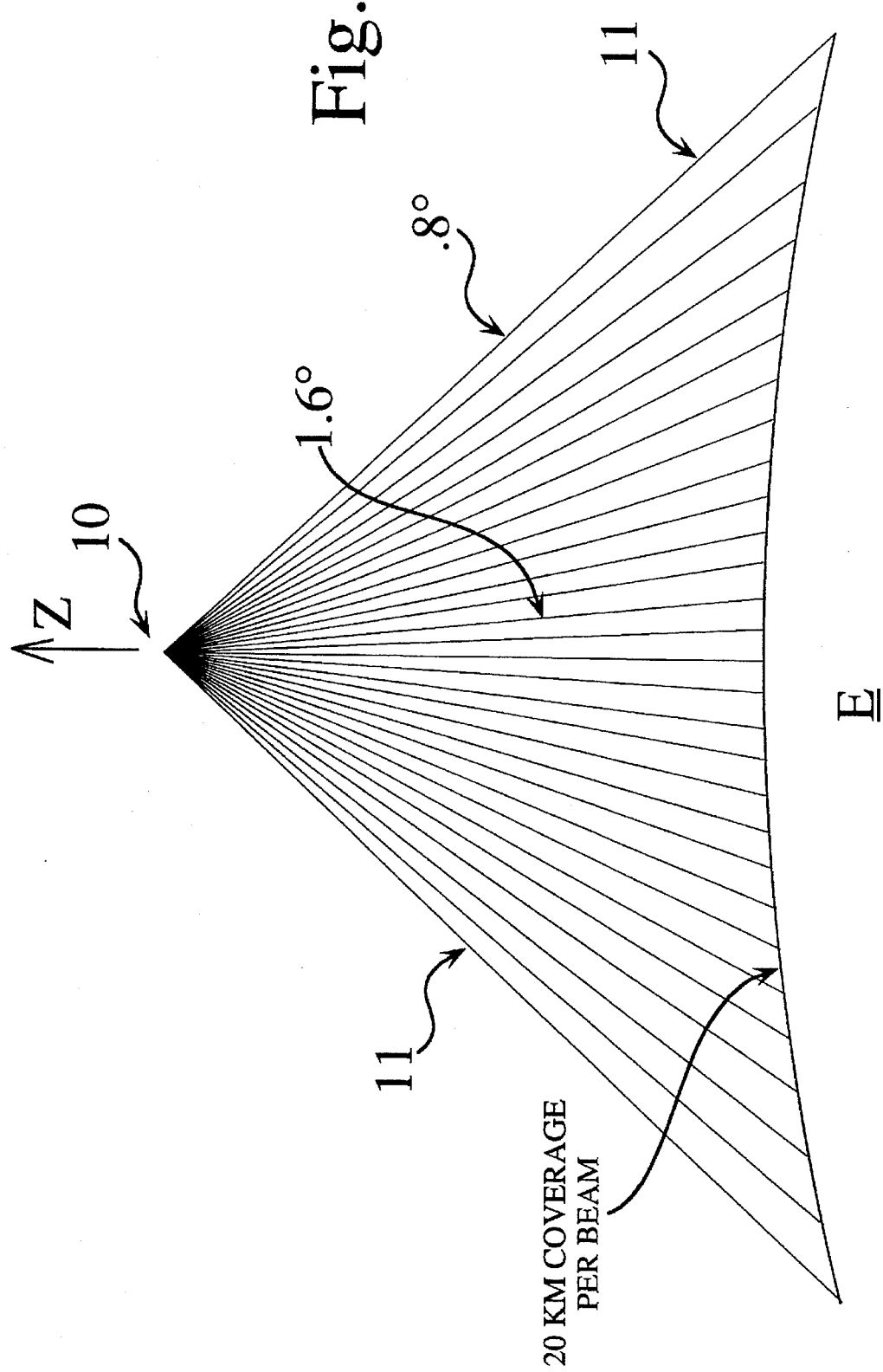

FIG. 3 presents a schematic depiction of the pattern of multiple beams generated by the satellite shown in FIGS. 1 and 2.

Figure 4:
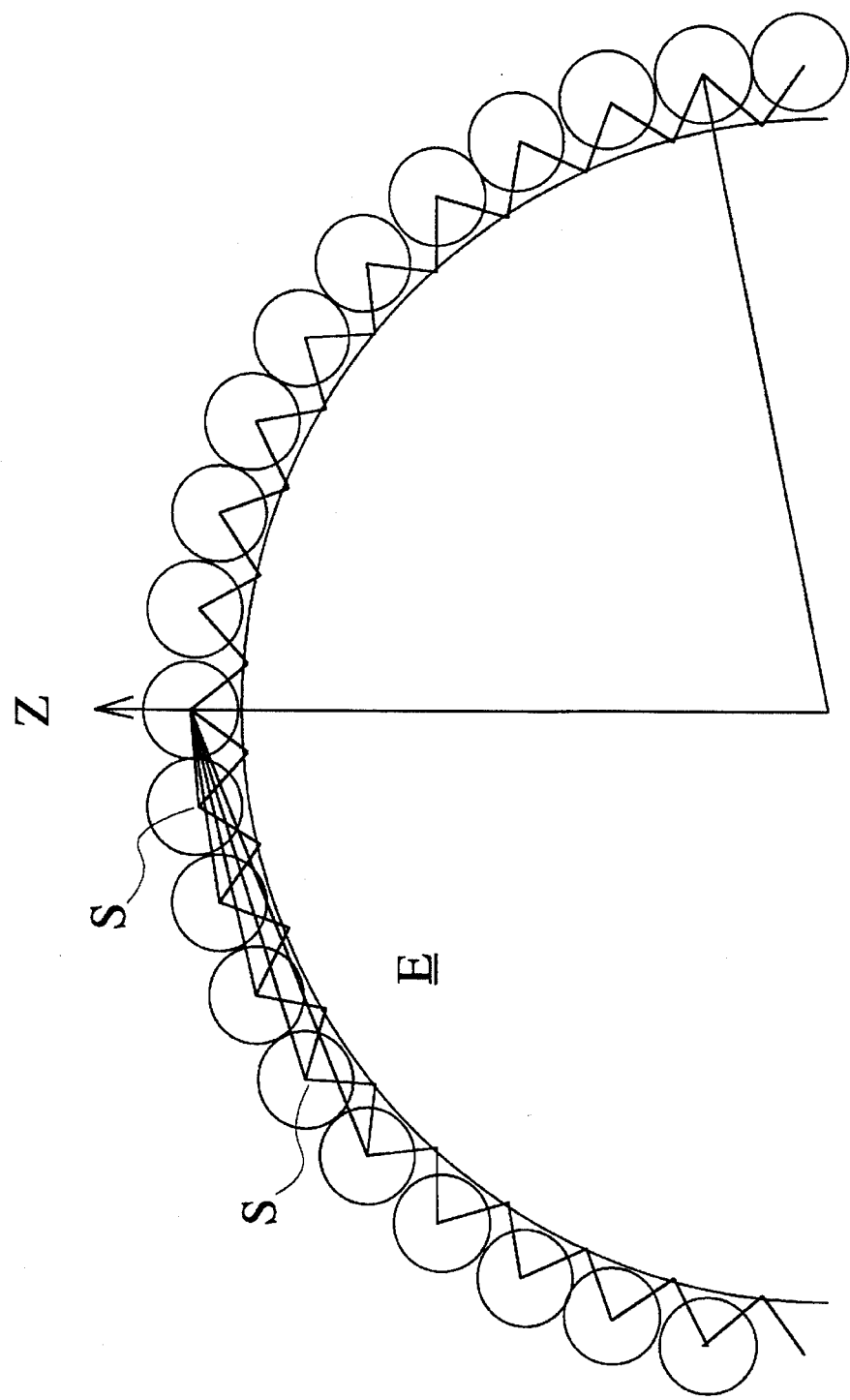
Figure 5:
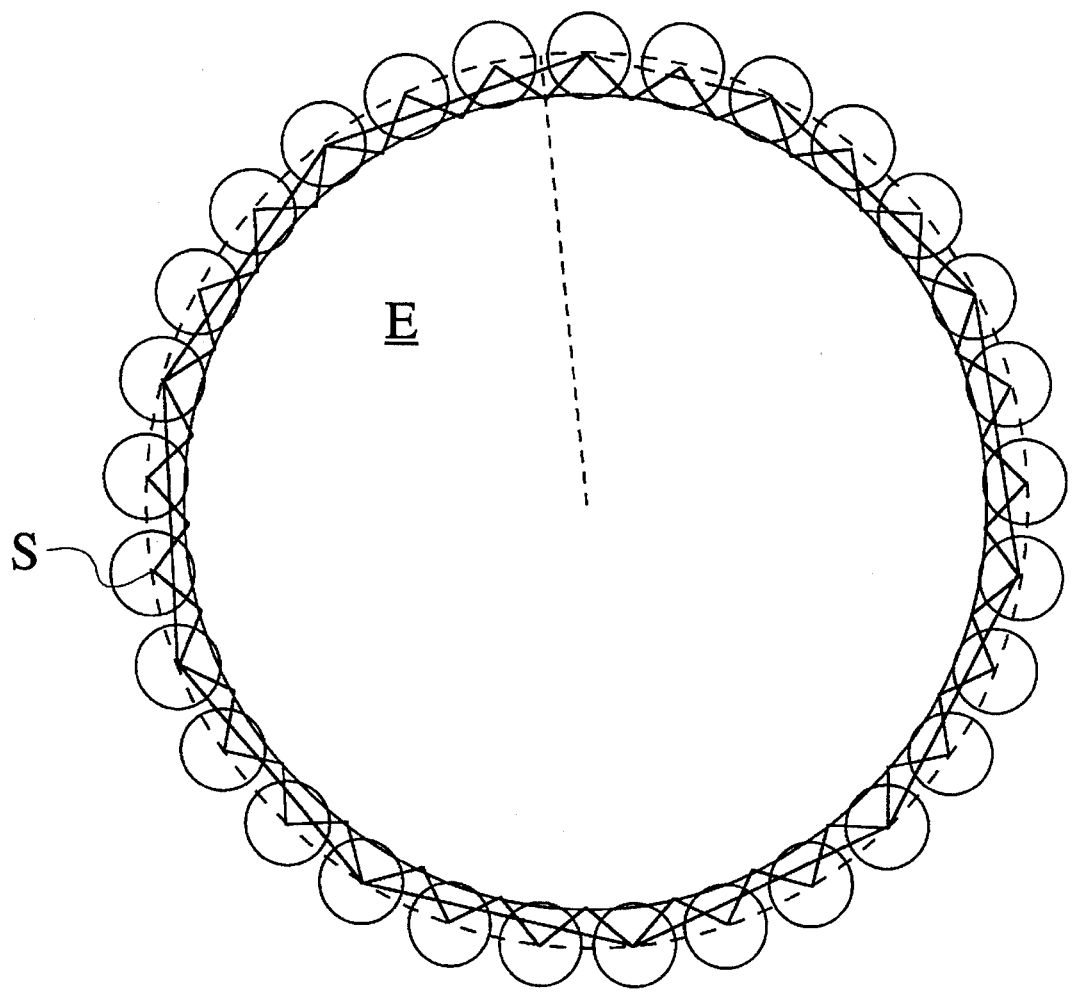

FIGS. 4 and 5 are plots that reveal the geometric relationship of several spacecraft traveling in one of the many orbital planes in the satellite constellation. The pathways between neighboring satellites that are not occluded by the limb of the Earth provide communication links between spacecraft in the same orbit.

Figure 6:
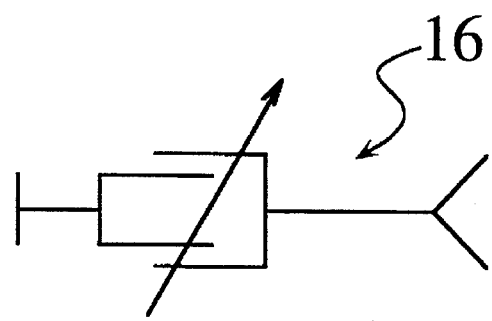

FIG. 6 reveals a schematic diagram of a GaAs MMIC time delay network.

Figure 7:
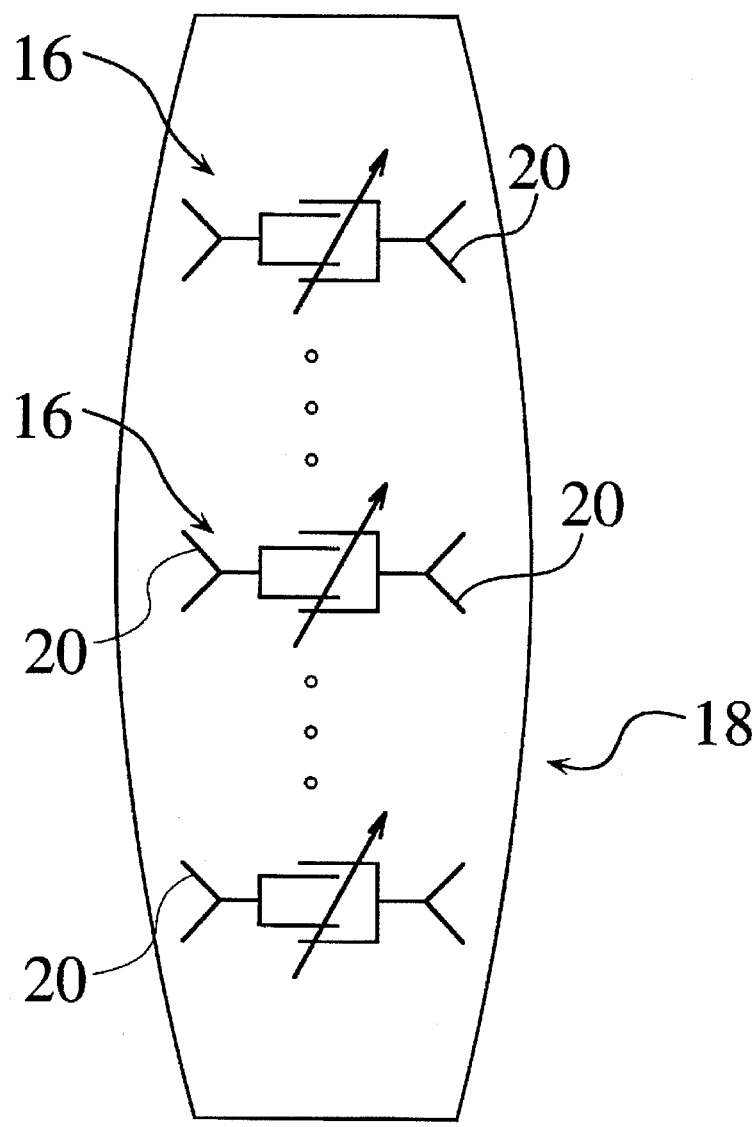

FIG. 7 shows a schematic of the active lens, which includes a large number of the time delay networks shown in FIG. 6.

Figure 8:
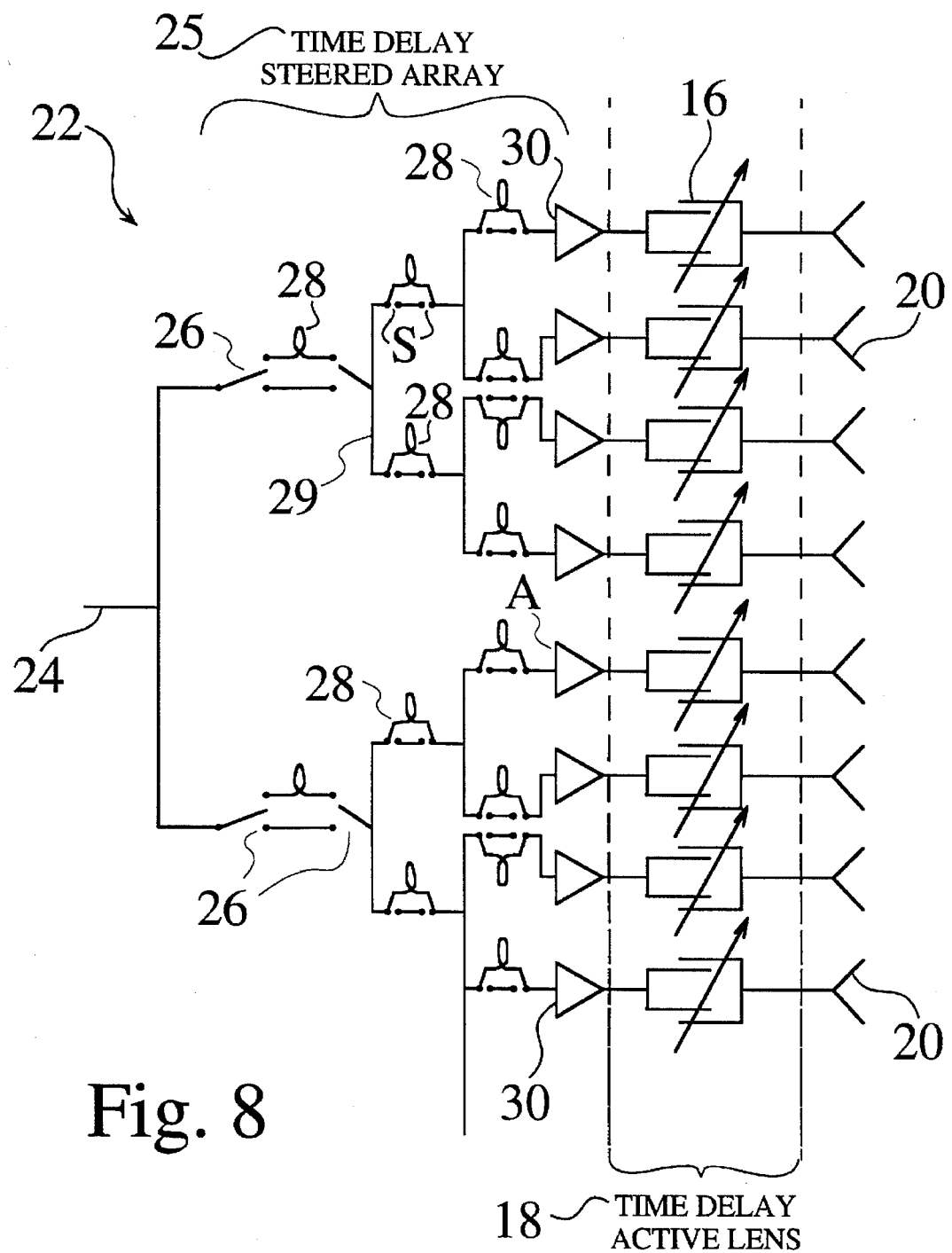

FIG. 8 is a schematic illustration of an active lens which incorporates a time delay steered antenna array.

Figure 9:
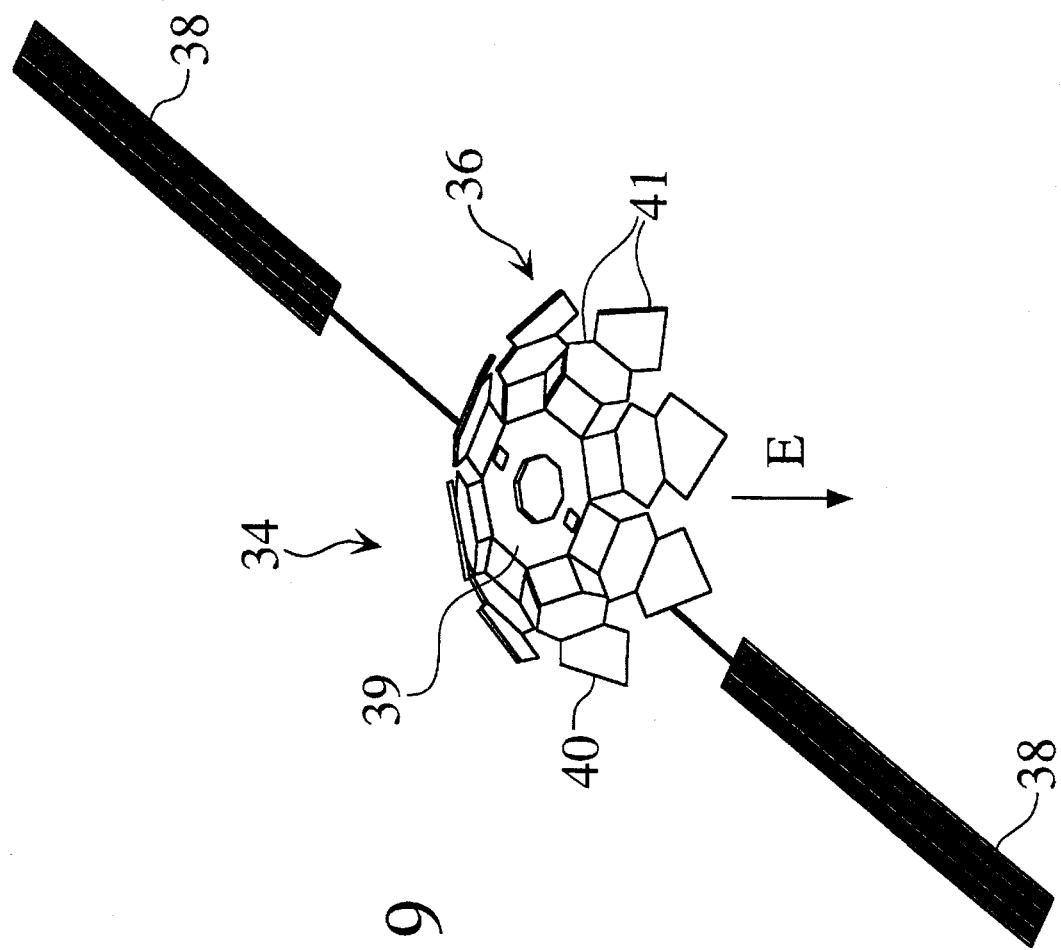

FIG. 9 is a perspective schematic view of another of the satellite embodiments that may be utilized in accordance with the present invention. The satellite is shown in Earth orbit as seen from the ground, and the antenna array situated between two solar panels is pointed toward Earth E.

Figure 10:
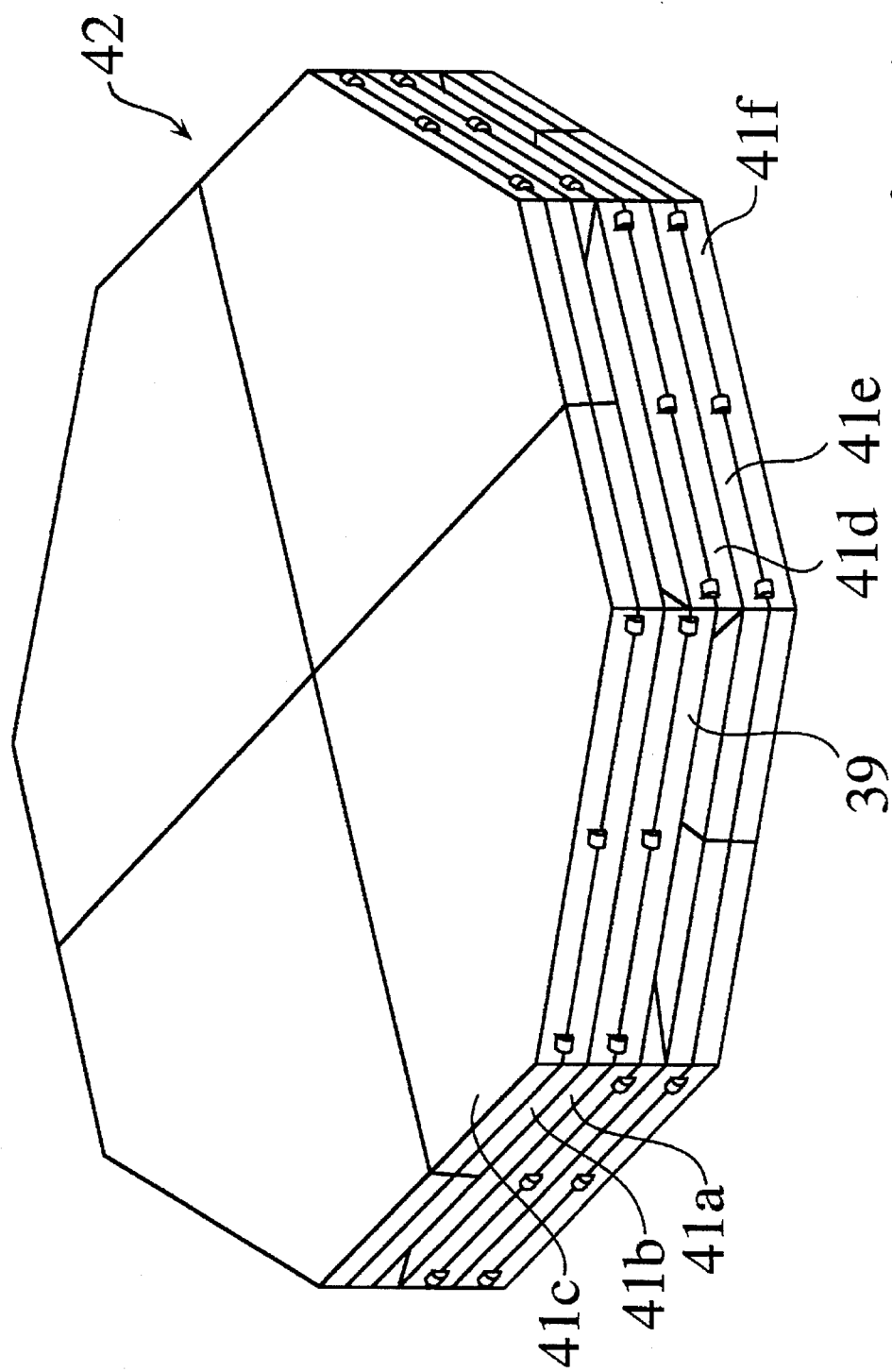

FIG. 10 depicts the satellite exhibited in FIG. 9 in its stowed configuration, revealing folded, non-reflecting structural support panels.

Figure 11:
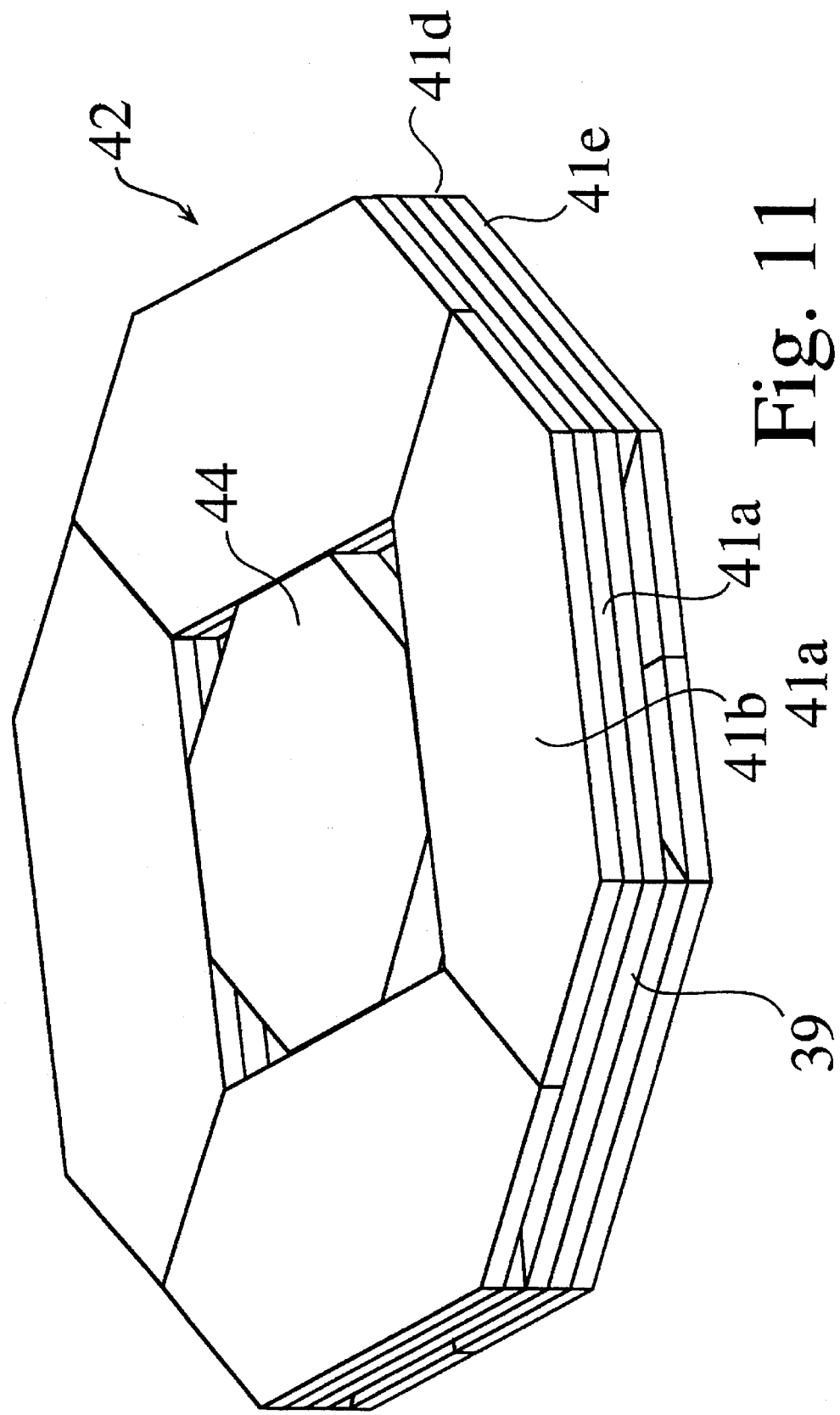

FIG. 11 reveals the stowed configuration of the satellite displayed in FIG. 10, but with its upper and lower panels removed to reveal a bus.

Figure 12:
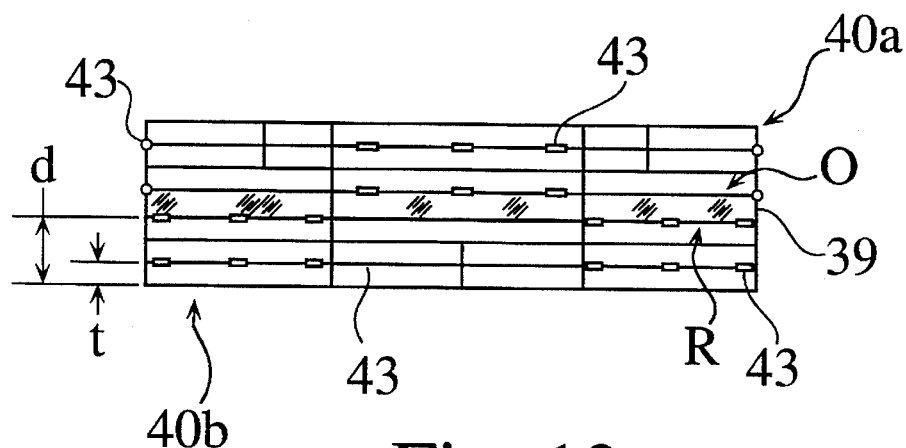

FIG. 12 is a side elevation depicting the stowed satellite configured so that one-half of its panels are stowed against the obverse face of the central plate and one-half of its panels are stowed against the reverse face of the central plate.

Figure 13:
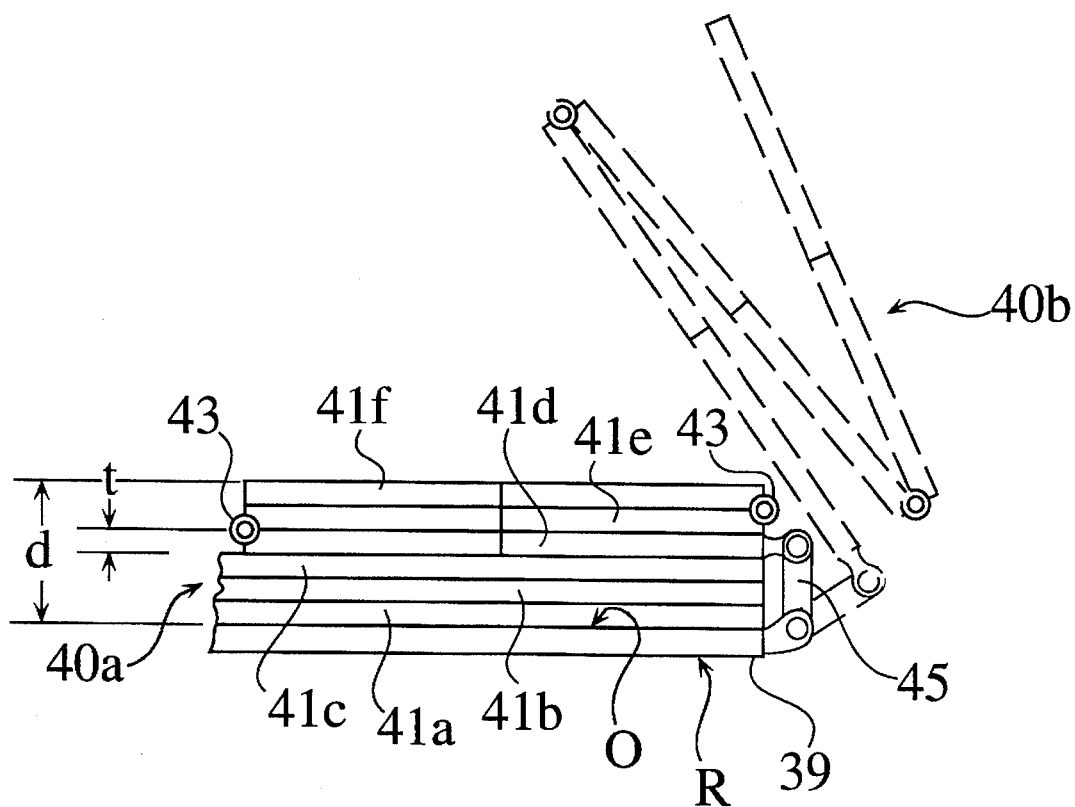

FIG. 13 is a partial side elevation depicting the stowed satellite configured so that all of its panels are stowed against the obverse face of the central plate, useful in understanding the function of stand-off brackets.

Figure 14:
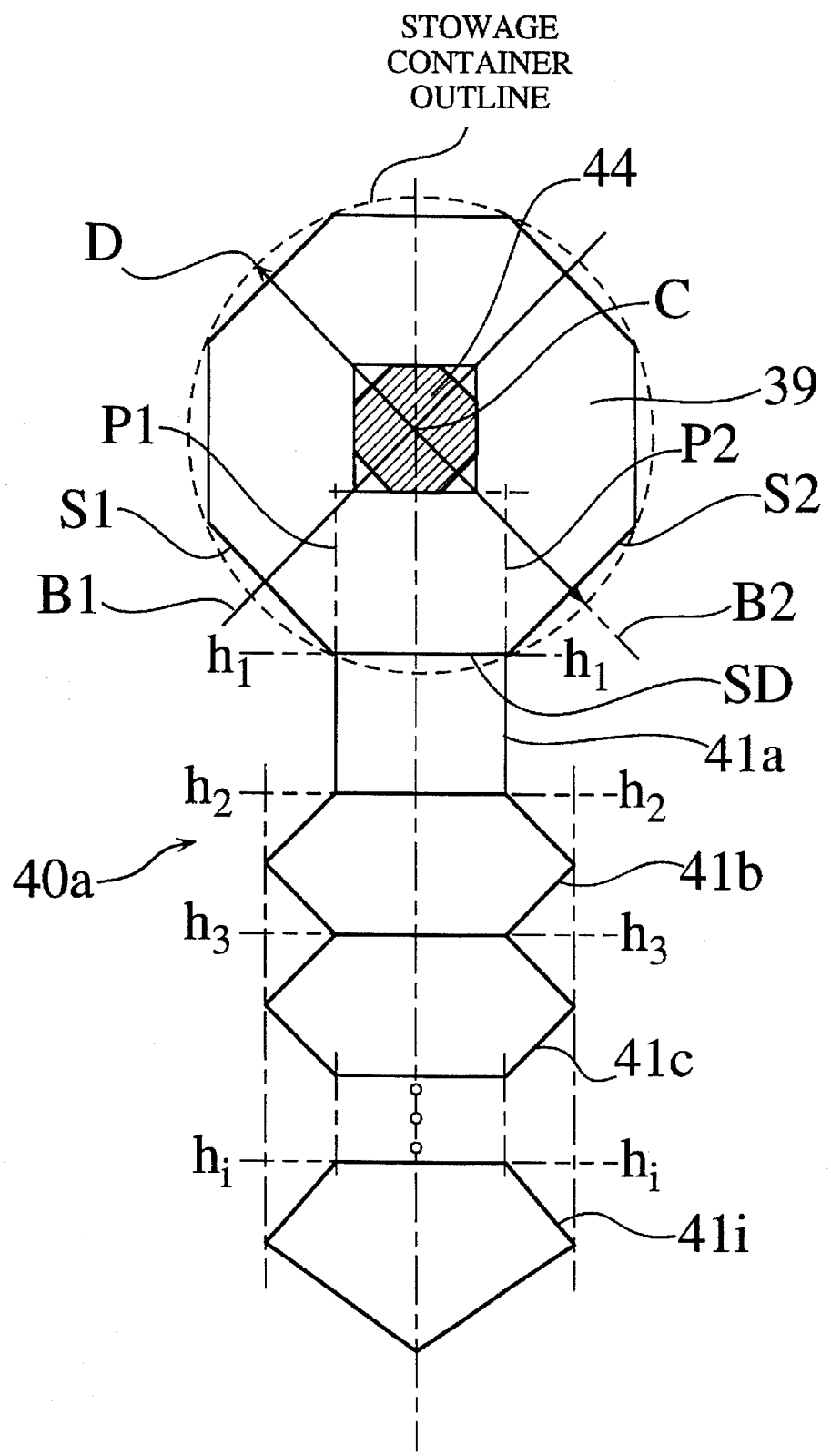

FIG. 14 is a partial plan view of the satellite showing a typical articulated arm, containing i panels, in its deployed configuration.

Figure 15:
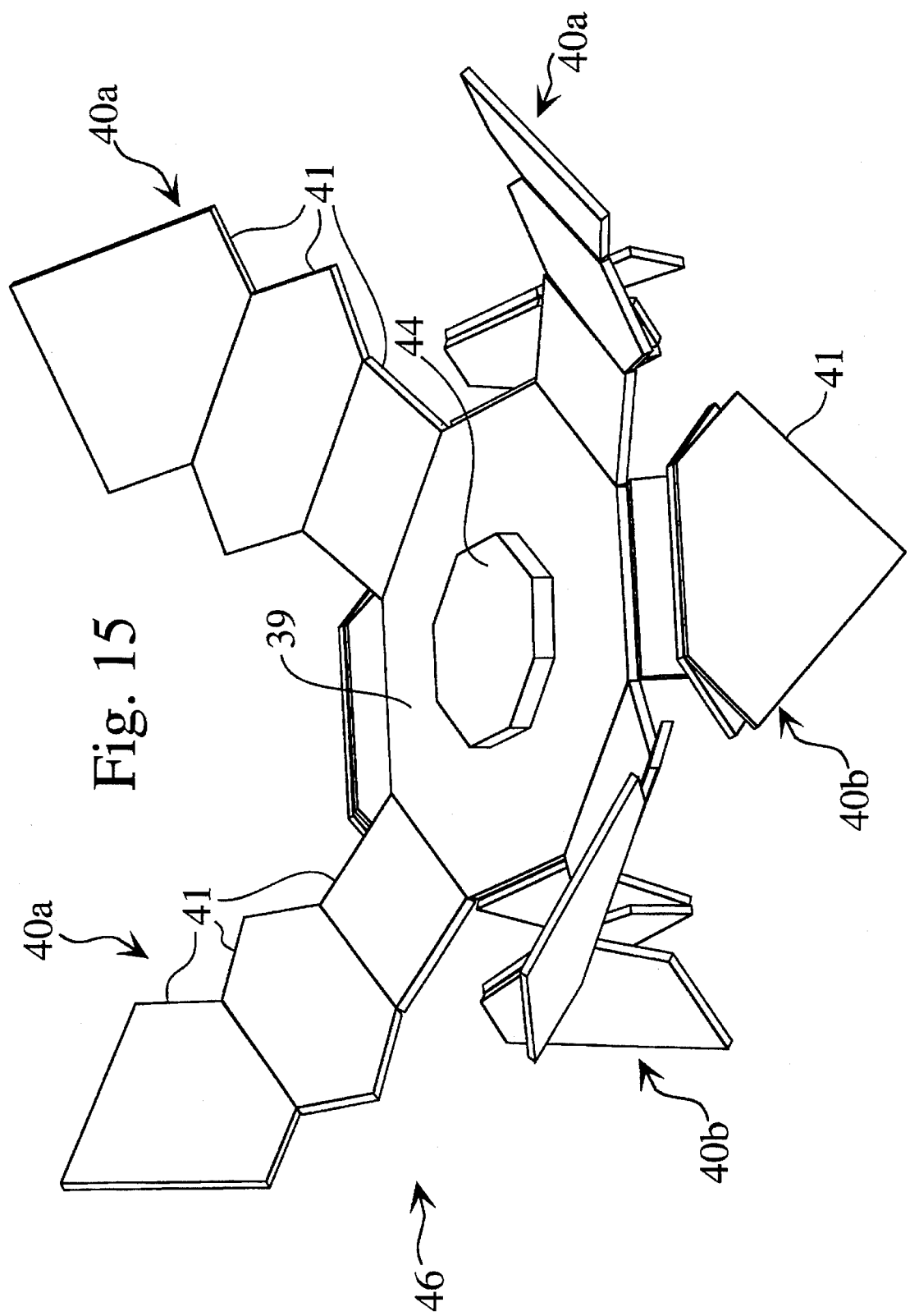

FIG. 15 illustrates the satellite as it unfolds from its stowed configuration on both sides of the central plate into its orbital configuration.

Figure 16:
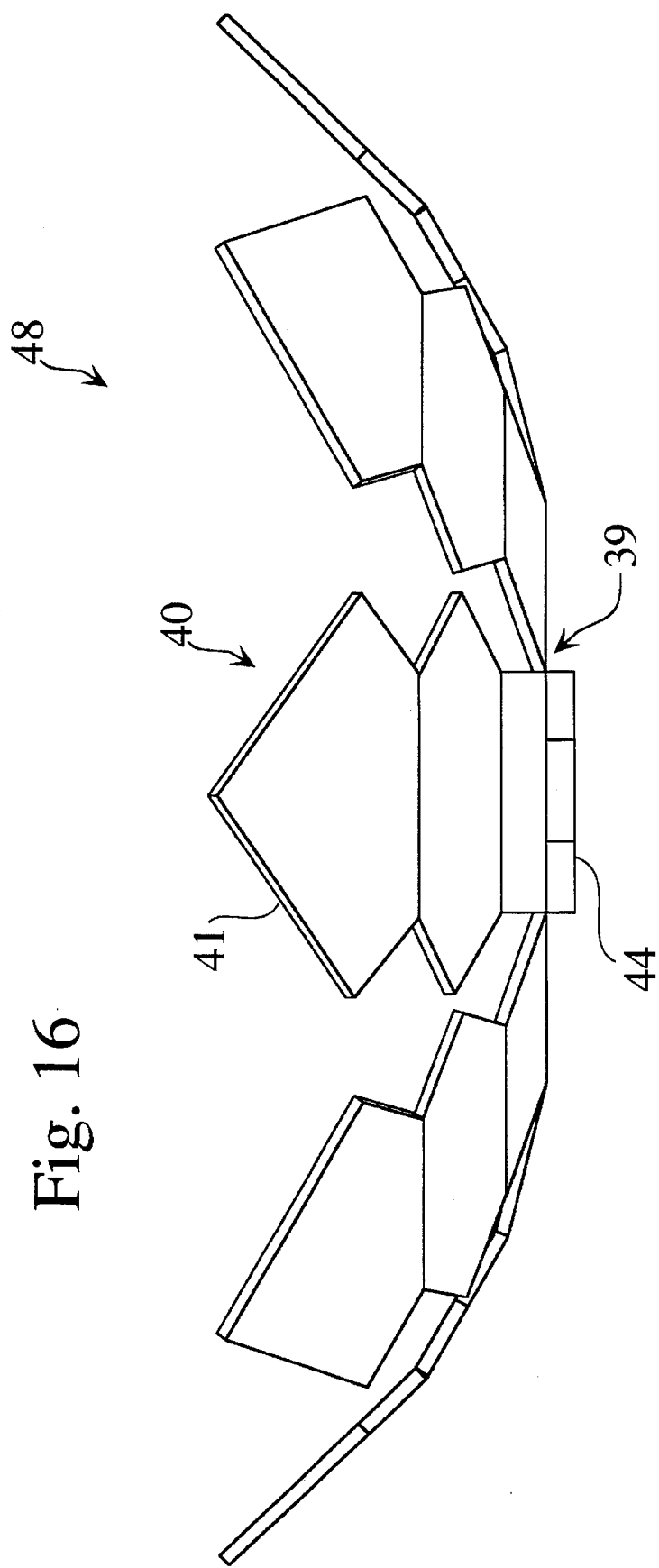

FIG. 16 is a detailed presentation of the unfolded panels.

Figure 17:
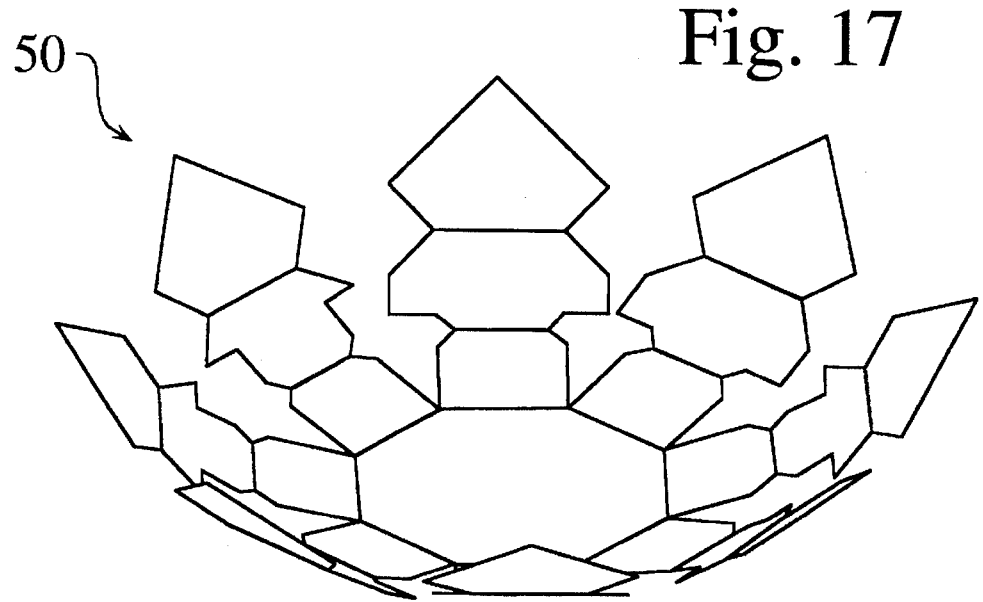
Figure 18:
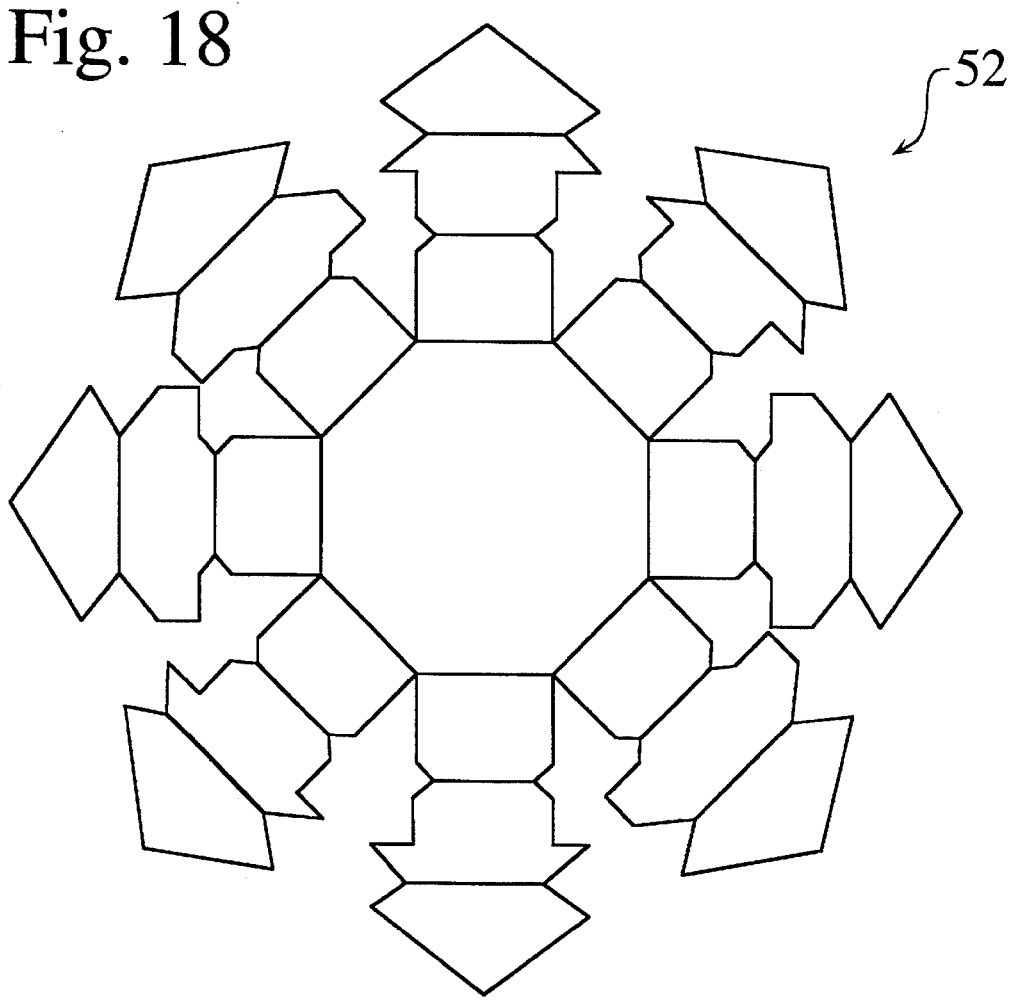
Figure 19:
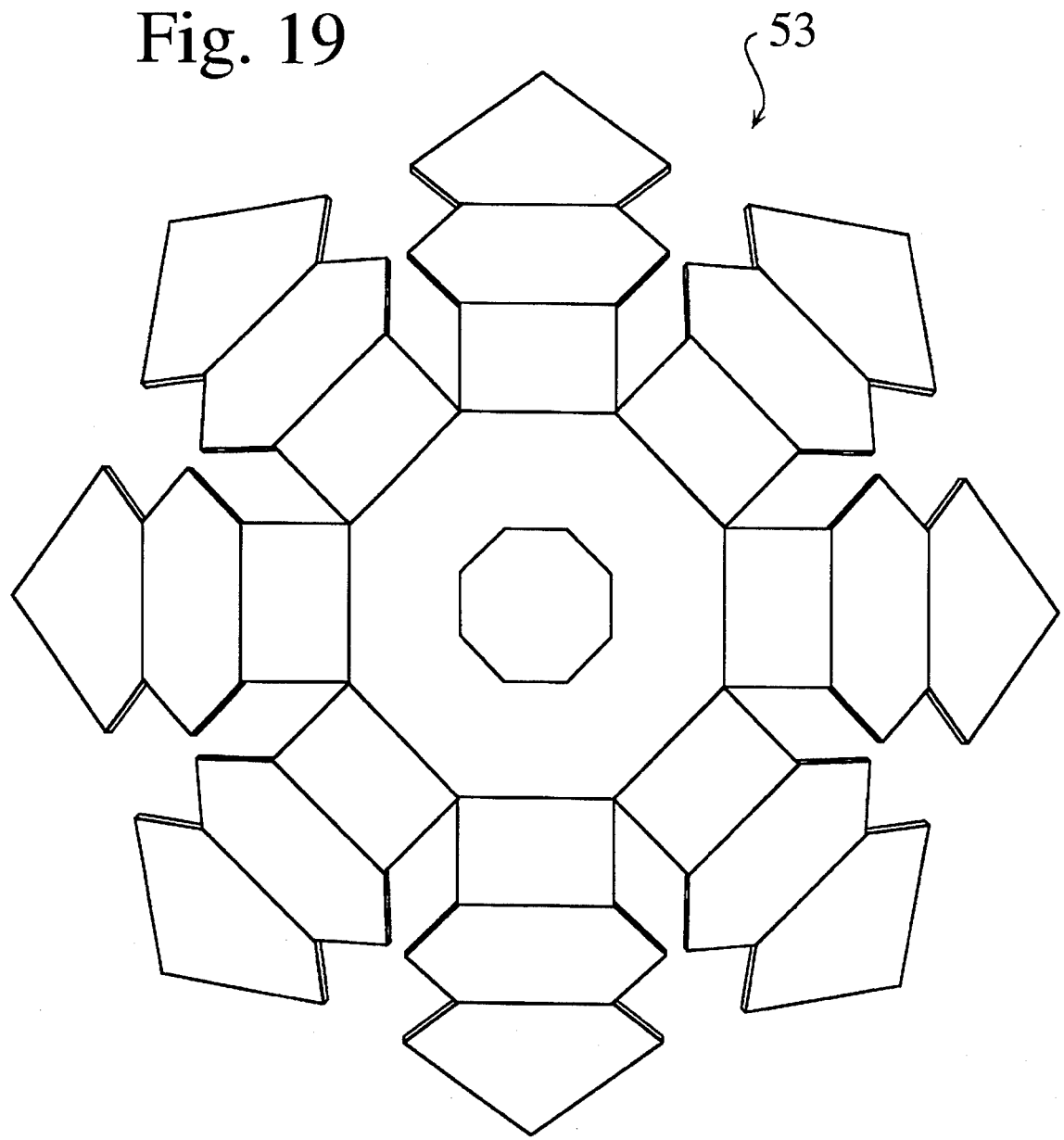

FIGS. 17, 18, 19 supply additional side perspective and bottom views of the unfolded panels. Alternate shapes are shown for some of the panels illustrating how the panel planform may be configured for varied area, preventing interference and depending on the number of antenna elements required.

Figure 20:
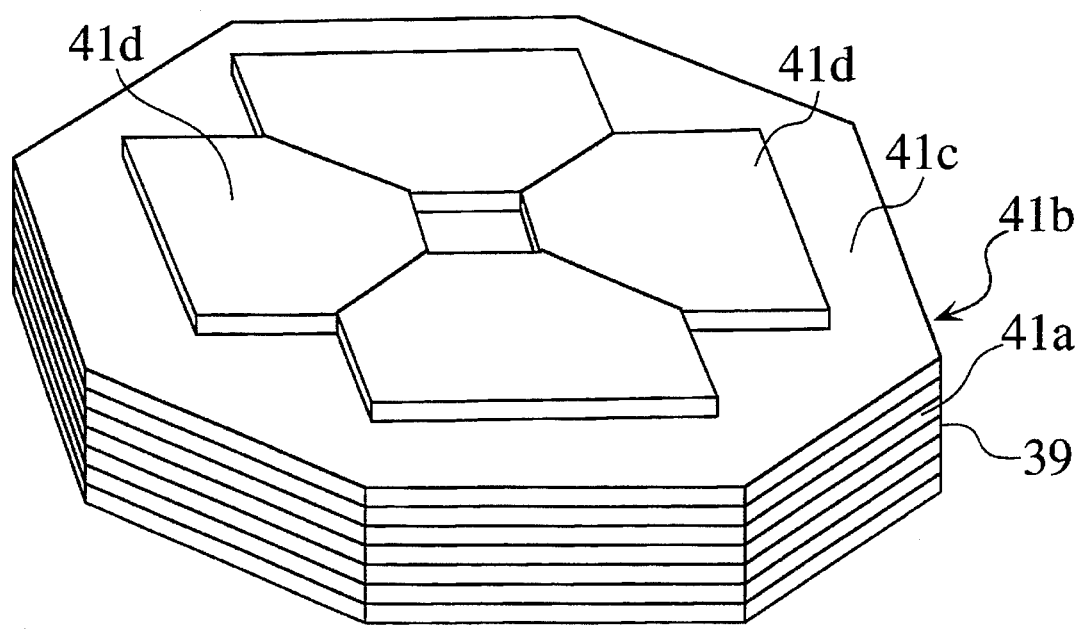

FIG. 20 is a perspective view of the satellite in its stowed configuration showing smaller, inter-satellite link antenna panels at the top of the stack.

Figure 21:
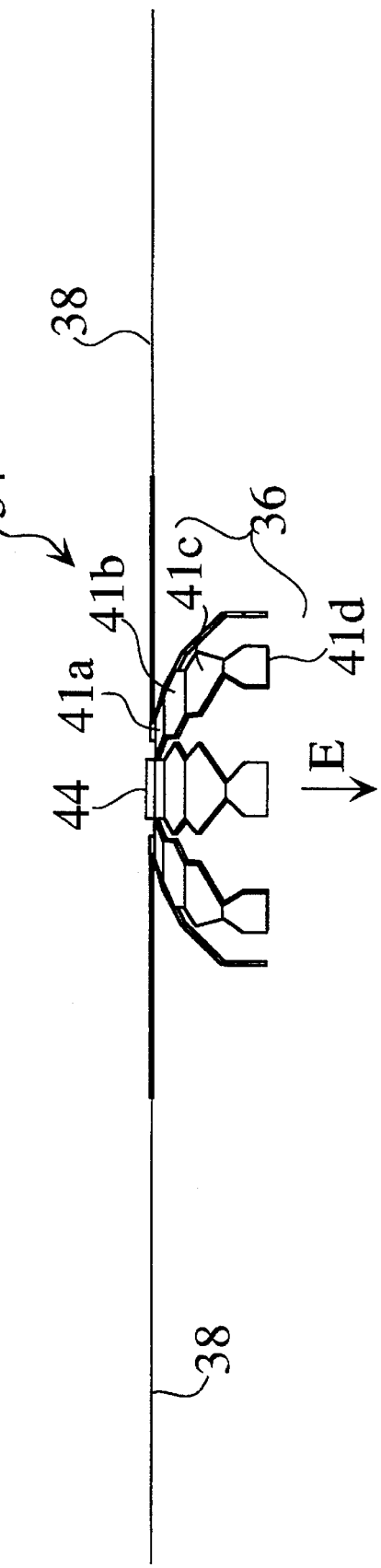
Figure 22:
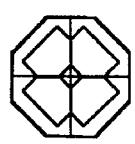
Figure 23:
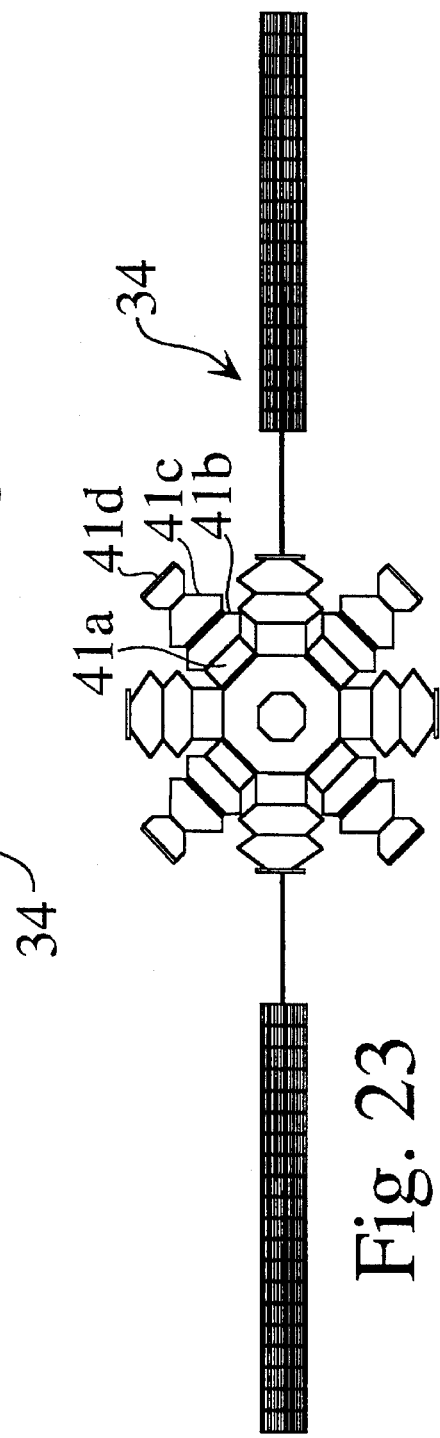
Figure 24:
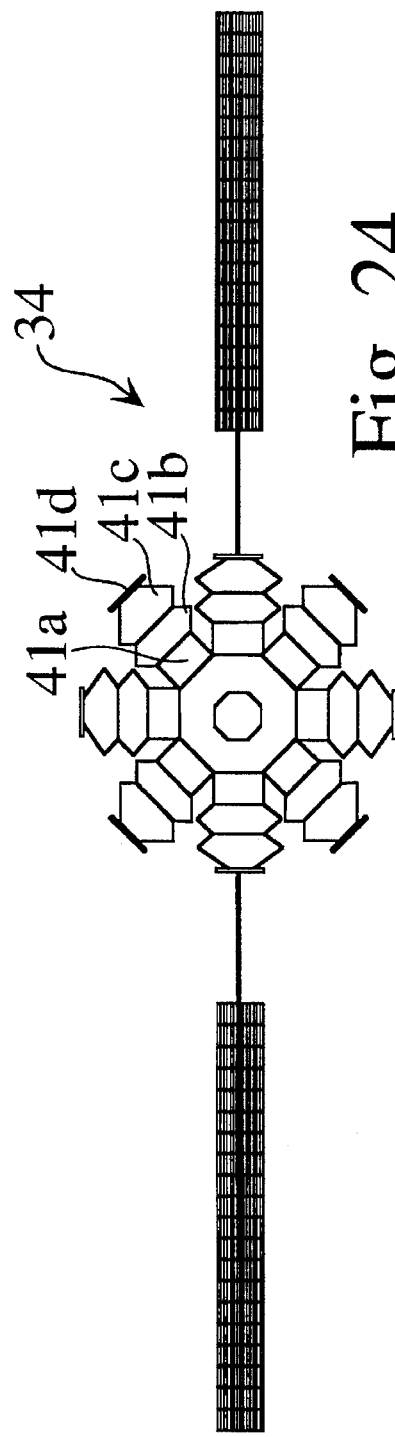

FIG. 21 is a side view of the orbital configuration with the solar panels fully extended and the smaller, inter-satellite link antenna panels deployed.

FIGS. 22, 23, 24, 25 and 26 comprise a series of views that illustrate the satellite at various stages of deployment.

FIG. 27 is a view of the central body together with a series of protruding inter-satellite link antennas in an alternative embodiment.

Figure 28:
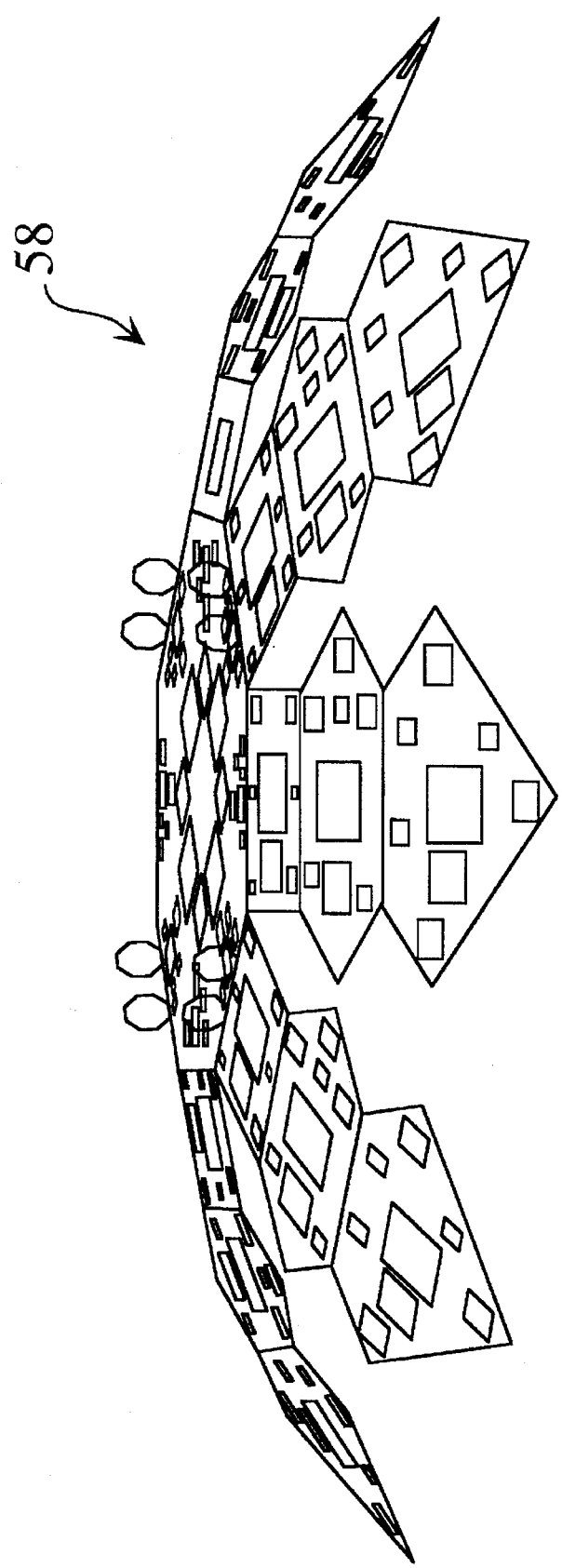
Figure 29:
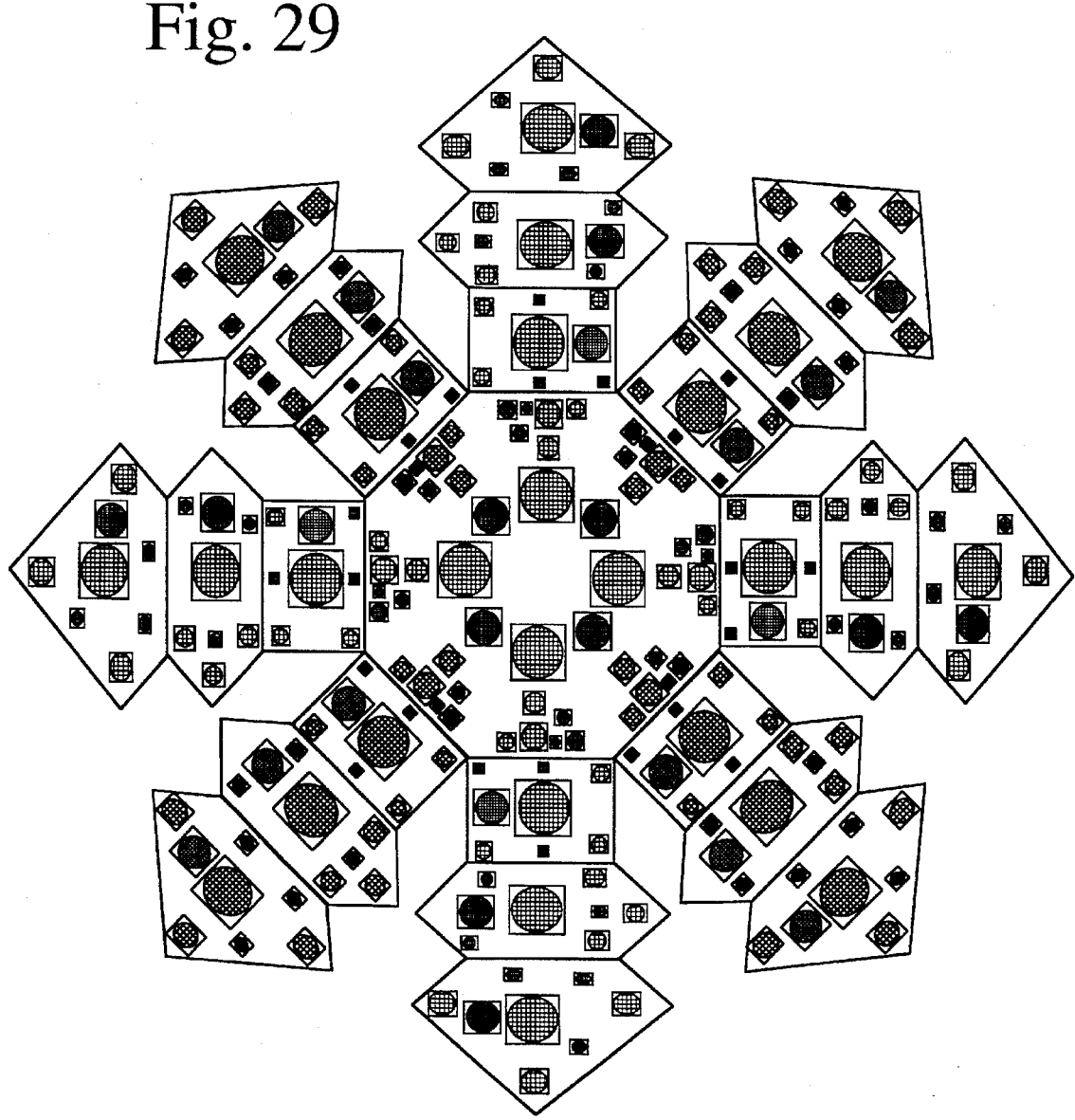
Figure 30:
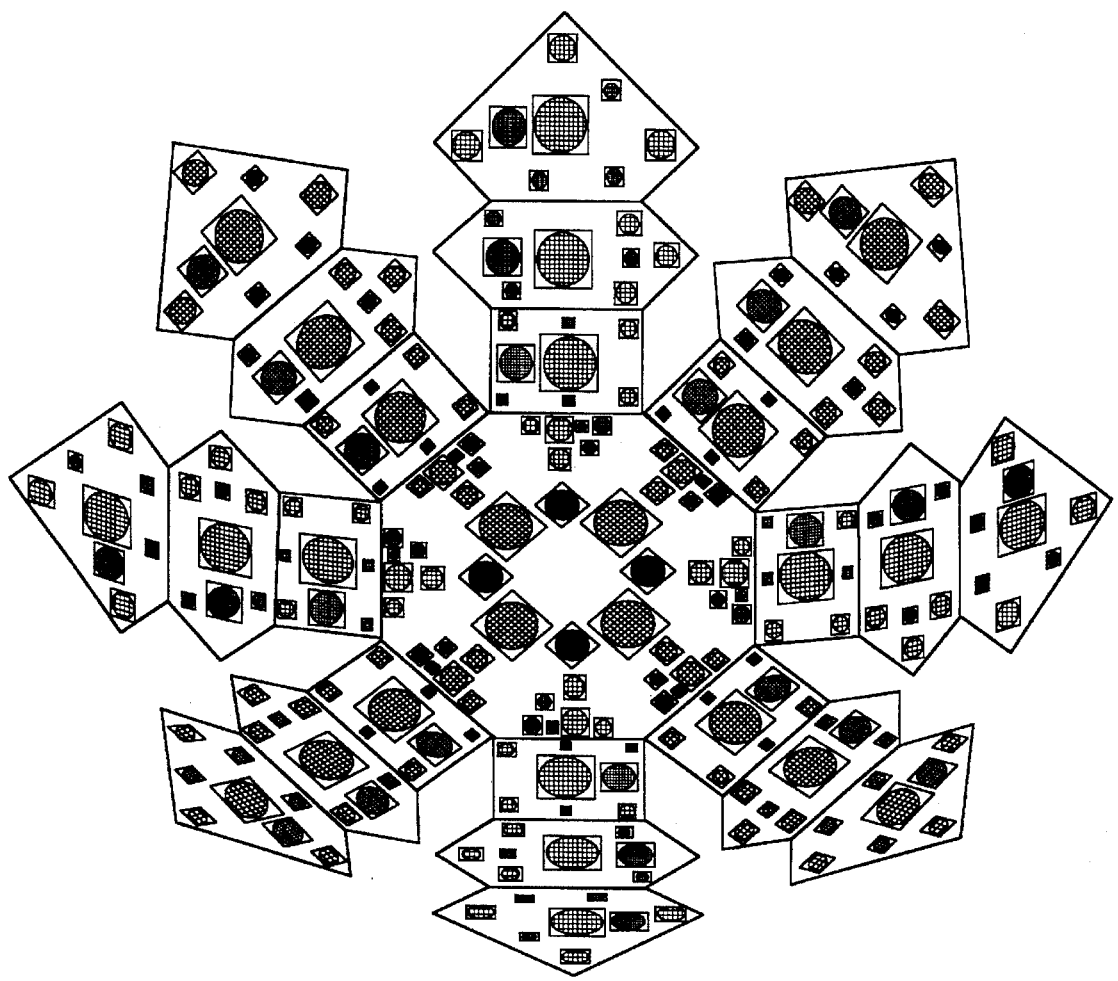
Figure 31:
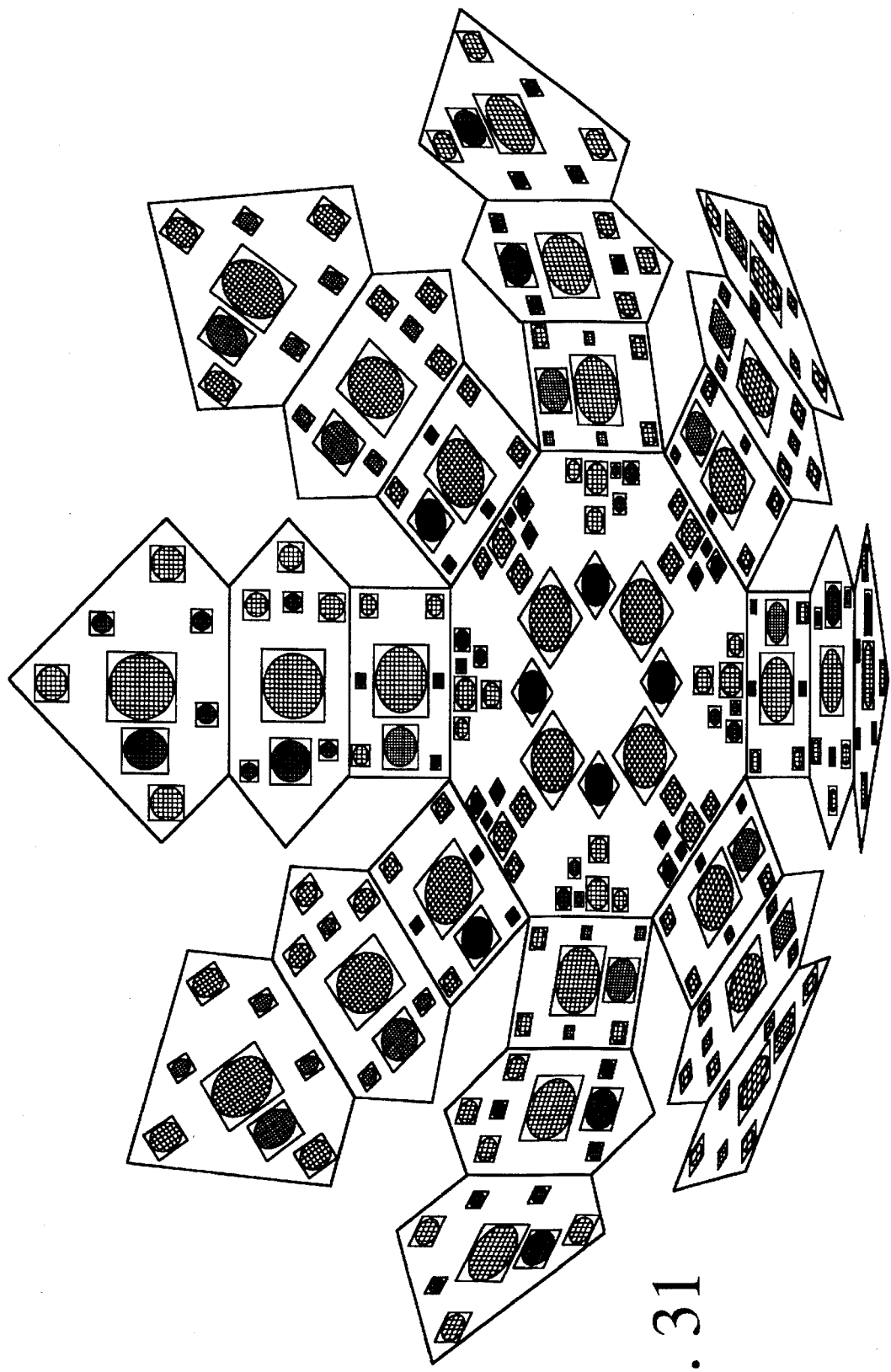
Figure 32:
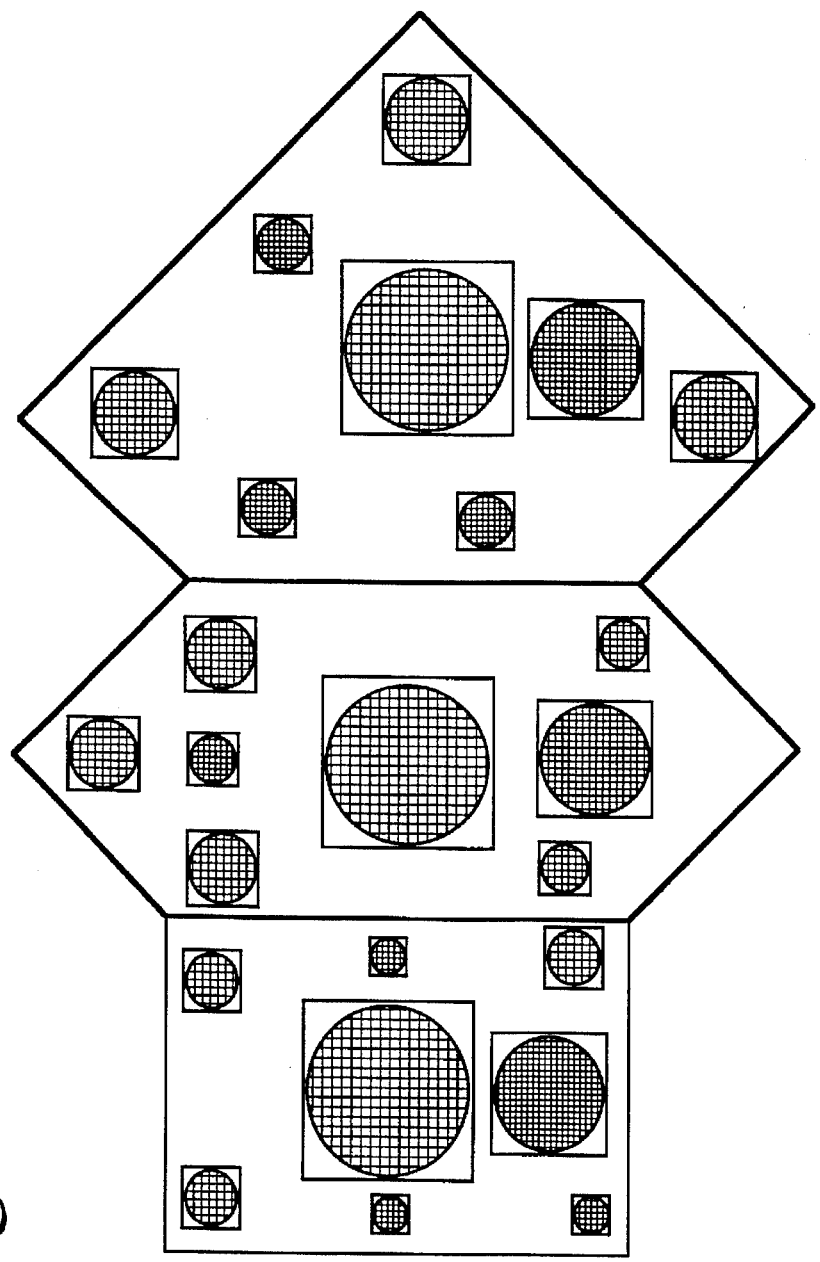
Figure 33:
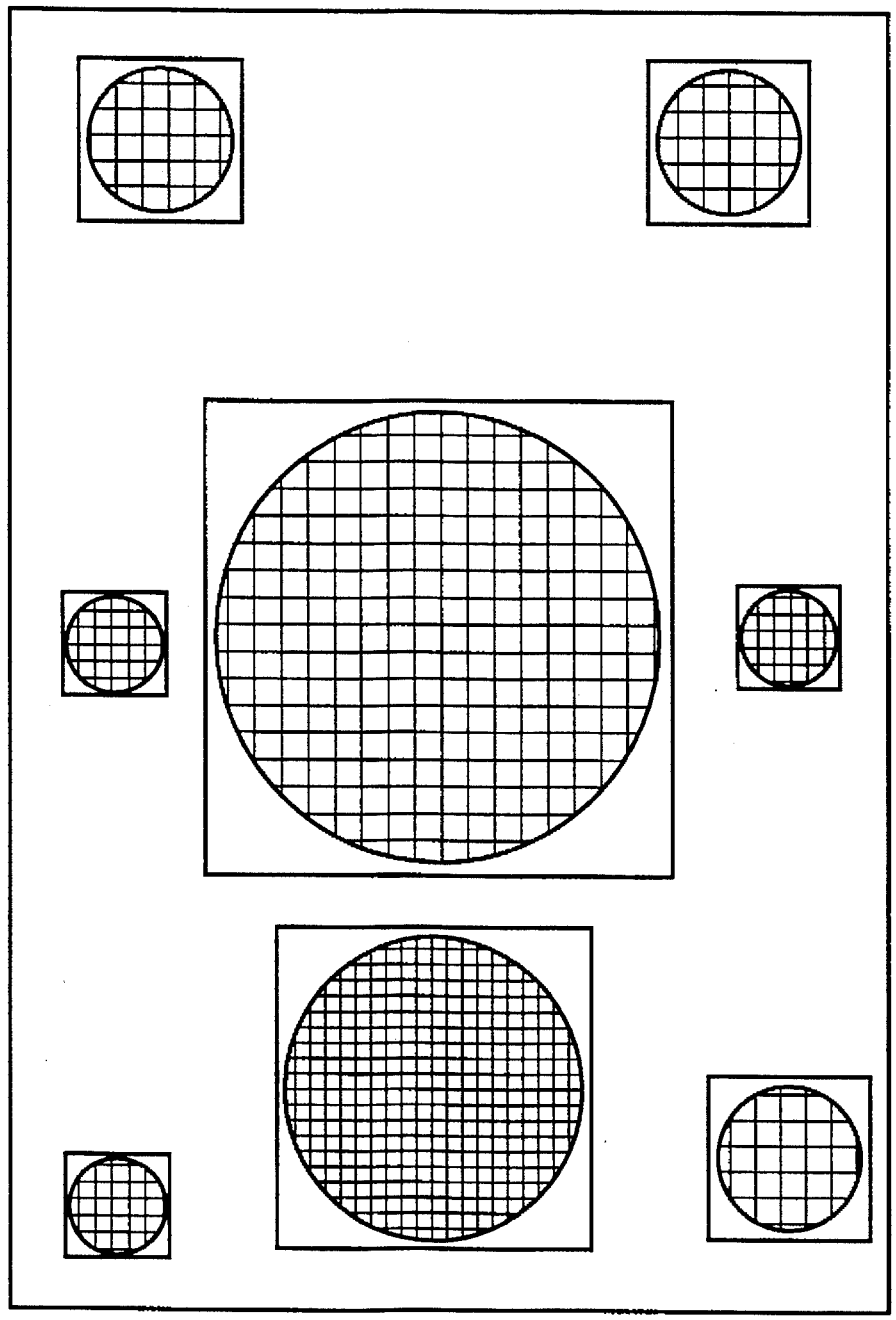
Figure 34:
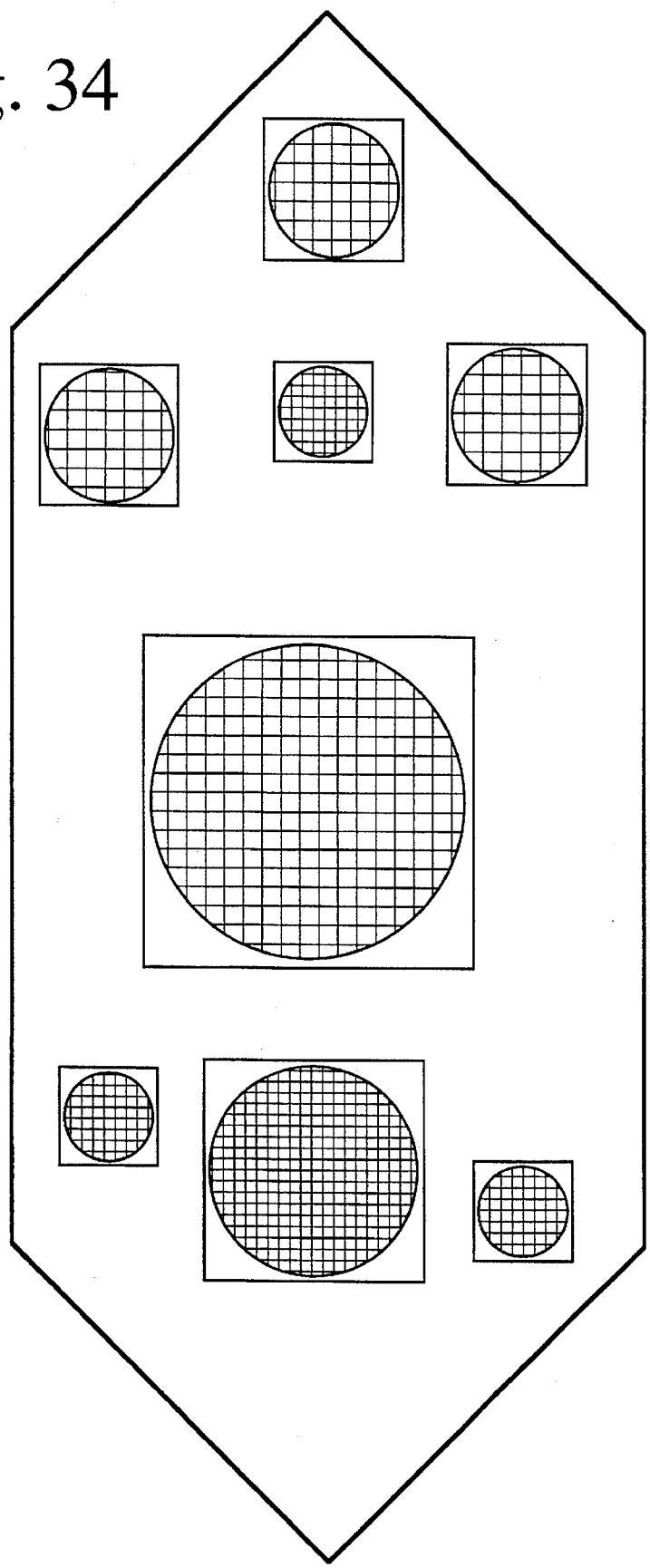
Figure 35:
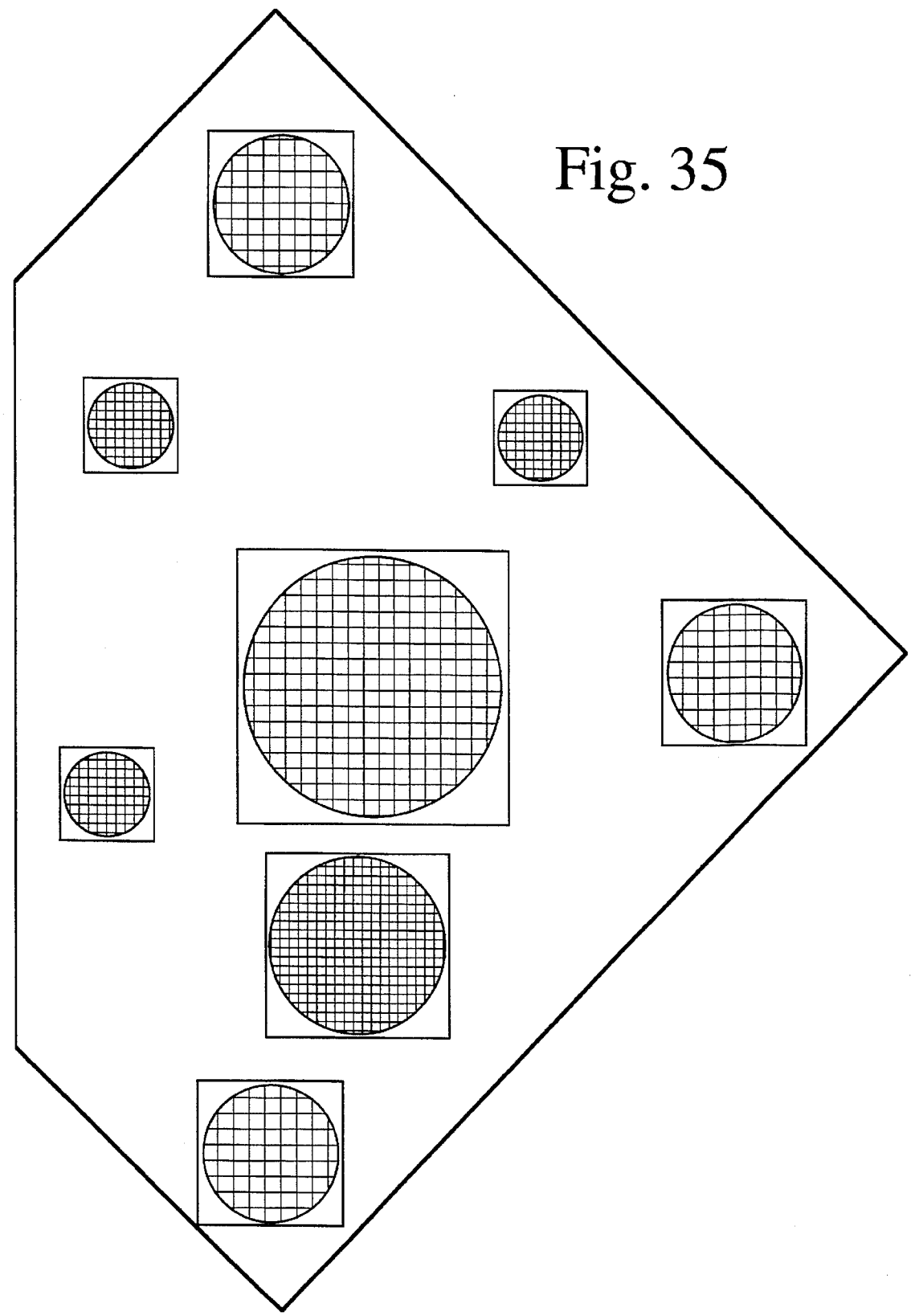

FIG. 28 is a view of the panels that also shows the deployment pattern of antenna elements, while FIGS. 29, 30 and 31 provide more detailed views of the antenna elements.

FIGS. 32, 33, 34 and 35 furnish enlarged views of smaller groups of panels bearing the antenna elements.

Figure 36:
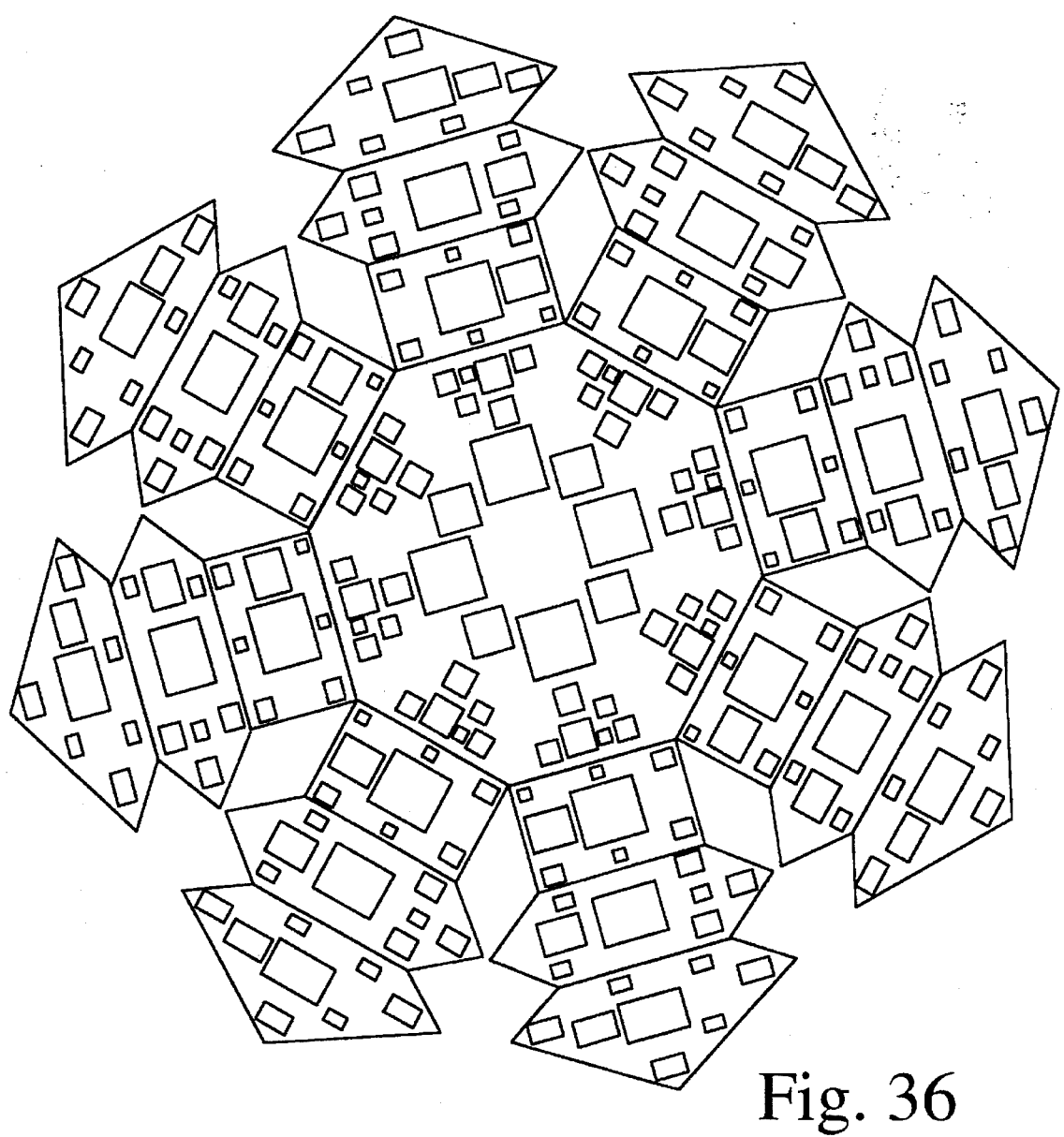
Figure 37:
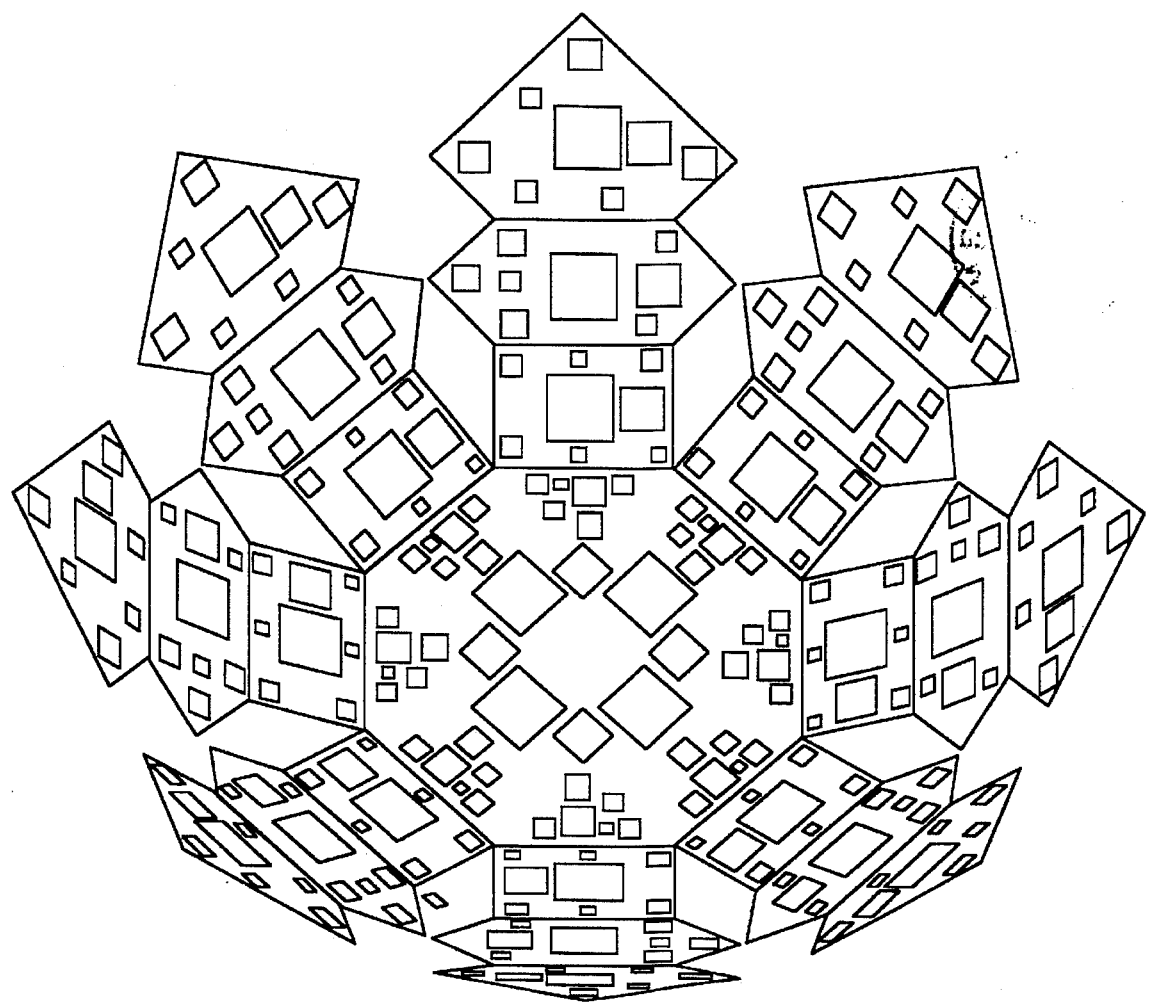

FIGS. 36 and 37 are schematic illustrations that show the panels covered by numbered antenna elements.

Figure 38:
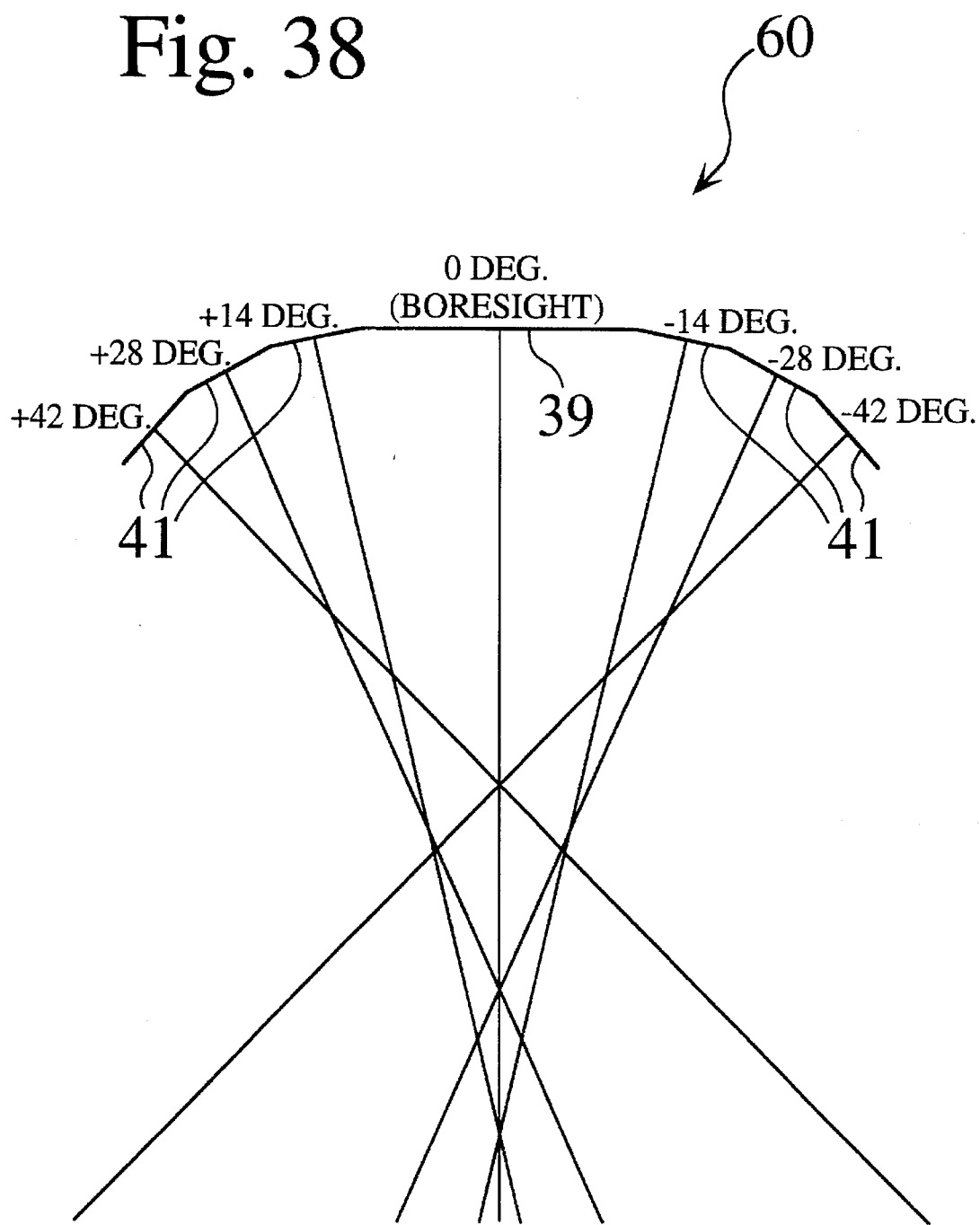

FIG. 38 is a schematic plot of the lines-of-sight of beams generated by the antenna elements.

A DETAILED DESCRIPTION OF PREFERRED AND ALTERNATIVE EMBODIMENTS

FIG. 1 depicts one of the preferred embodiments of the present invention. This perspective view shows a satellite S that includes an array 10 of hexagonal antenna facets 12 that are mated together along their six-sided boundaries to form a slightly flattened, hemispherical shell. The antenna shell is connected to two rectilinear, unfurled, solar panels P which trail the body of the spacecraft S.

FIG. 2 represents the patterns or "footprints" 14a, 14b, and 14c, of the radio beams 11 formed on various portions of the Earth's surface E. The set of beams marked 11a travel the shortest possible distance from the spacecraft S to the Earth E because these beams 11a travel along a pathway which runs from the ground to the Zenith Z and back. The area on the surface illuminated by this set of beams 11a results in a generally circular footprint 14a. Other sets of beams, like those marked 11b and 11c, are more inclined to the line that runs from the center of the Earth toward the Zenith Z, and the areas 14b and 14c irradiated by these beams 11b and 11c become progressively more elliptical as the angle of inclination becomes larger. The radio beams 11 serve subscribers using portable PT, mobile M and fixed terminals F and gateways G.

FIG. 3 combines many sets of beams 11 and portrays a complete set of line-of-sight radio waves generated by one spacecraft. FIGS. 4 and 5 are geometric plots which include sight lines between neighboring satellites that travel along the same orbit. Several spacecraft in a single orbital plane can communicate with each other if they are located above the horizon of the Earth. Satellites communicate among one another using a 60 GHz inter-satellite frequency band. In one of the preferred embodiments, a 1.5 foot antenna provides approximately 45 Db of gain which supports a practical inter-satellite link (ISL). Four fixed and two electronically steerable antennas are used on each satellite for ISL links. Optional links in the orbital plane may increase the number of ISL antennas to ten, eight of which would be fixed and two of which would be steerable.

In one of the preferred embodiments of the invention, the satellites shown in the figures operate in a constellation which includes 29 sets of spacecraft flying in 29 orbits. Another embodiment utilizes a constellation having groups of 40 satellites in each of 21 orbital planes. The entire fleet travels around the Earth at a height of 700 km (435 miles). More detailed information about the entire network may be found in a related, copending application entitled *Satellite Communication System* by Edward F. Tuck et al.

I. Antenna Array

The antenna array 10 is designed to transmit and receive signals from terrestrial units that are located within the footprints 14 produced by the electronically steered beams 11. In one embodiment, only those terrestrial units that are within the conical line-of-sight region that is defined by a minimum elevation angle, or "mask angle," of 40 degrees can be serviced by a particular spacecraft. The hexagonal antenna facets 12 and their related signal processing circuitry produce hexagonal coverage patterns. Each of the hexagonal antenna facets 12 include a plurality of matched pairs of surfaces for separately transmitting and receiving each of the radiated beams 11. In one embodiment of the invention, the radius to the center of each of the six sides of each facet 12 is 6.2 degrees, while the radius to the six corners of the hexagon subtends 7.16 degrees. A spacing of 12.41 degrees allows for 29 hexagonal coverage patterns in each orbital plane. A similar spacing along the Equator results in 29 orbital planes. This configuration of hexagonal facets offers double coverage in the equatorial regions and up to eight-fold coverage at higher latitudes, where larger numbers of subscribers are located. By selecting an odd number of satellites and planes, the center of the descending patterns will fall on the seams of the ascending patterns. This selection insures that virtually every region on the surface between the latitudes of 70 degrees North and South will be serviced by the constellation.

In general, and allowing for the somewhat inaccurate assumption that the Earth is spherical, the coverage angle of each satellite is given by the expression:

$$2\alpha = 2\arcsin\left(\frac{r\cos\theta}{r+h}\right)$$

where a is the half angle of the cone of Earth coverage in radians;

$\theta$ is the user antenna mask angle in radians;

r is the radius of the Earth (6378 km); and d is the height of the orbit (700 km).

Orbits of 700 km and a preferred 40 degree user antenna mask angle yield a coverage of 87.3 degrees. The slant range at the edge of the Earth coverage cone is determined by the equation:

$$d = \sqrt{((r+h)^2 - r^2)\cos^2\theta} - r\sin\theta = 1022 \text{ km}$$

The Earth coverage area of the cone is:

$$A = \pi(d^2 + h^2 - 2dh \cos(a)) = 1,568,000 \text{ km}^2$$

This figure represents the Earth coverage area of each satellite if the entire circular footprint is utilized. This area is divided into 256 "supercells," and each supercell is further divided into 16 smaller individual cells. The total number of cells created by each spacecraft is then 256×16, or 4096. Each of these 4,096 cells has an area of 383 km². If each cell is square, they measure approximately 19.6 km on a side. Although the preferred embodiment of the invention utilizes circular footprints, the footprints created by the satellites need not be circular. Any regular polygon inscribed in the circle may be effectively employed. Other alternative embodiments employ inscribed squares and inscribed hexagons. The area of the square is 63.7% of the total area, while the area of the hexagon is 82.7% of the total area. If the cell size is maintained constant, then the resulting numbers of cells are 2609 for the square and 3387 for the hexagon.

The spaceborne antennas are capable of providing a gain of 45 dB at the periphery of each footprint and 42 dB at the Nadir position. Because the beams generated by the spaceborne antennas are so powerful, Earth-based terminals can incorporate low power antenna designs which substantially eliminate any radiation hazards that might otherwise harm the user. Each antenna uses a combination of the 20 and 30 GHz frequency bands for satellite to ground communications, and propagates 256 simultaneous beams, which are multiplexed to 4,096 positions. In another embodiment of the invention, 64 beams are multipexed to 1,024 positions. Beams aimed at the horizon possess an elliptical, as opposed to a circular or polygonal, shape to compensate for the low grazing angle, so that a constant Earth coverage footprint is maintained. Uncorrected beams have an elliptical ground pattern which degrades spectral reuse efficiency. Electronic beam steering also permits the independent control of directivity gain and power gain. The beam steering provides a convenient method of correcting power levels during rain fades. The transmitted power gain from the satellite can be increased on transmit to overcome downlink fading. Satellite receive power gain can be increased during receive to overcome uplink fading. The use of these two techniques overcomes possibly poor communication performance during rainy weather conditions.

Signal processing components residing in the spacecraft include GaAs MMIC filters and are responsible for electronically steering active antenna arrays on board each satellite. FIG. 6 reveals a schematic diagram of a GaAs MMIC time delay network 16. FIG. 7 shows a schematic of the active lens 18, which includes a large number of the time delay networks 16 coupled to radiating elements 20. In the preferred embodiment of the present invention, a circuit Model No. TD101 produced by Pacific Monolithics, Inc. in California is employed as the time delay network. Other more conventional time delay networks may also be employed. The electronic steering is accomplished by using these time delay networks 16 to create an active lens 18. The focal point of the lens 18 is related to the directivity gain of the antenna 12 and can be controlled electronically. The ability to control the directivity gain is important for communications satellites in low Earth orbit because less gain is needed when a cell is addressed at the satellite Nadir than when a cell is addressed at the periphery of the satellite footprint 14. It is also desirable to increase the directivity gain in the elevation plane when addressing a cell at the satellite footprint periphery. The active lens 18 incorporated in the antennas 12 allows these variable directivity gains to be implemented without the reduction in efficiency that is associated with conventional antenna arrays. The active lens 18 illustrated in FIG. 7 is the microwave analog of an optical lens. By increasing the time delay for the signal paths in the center of the lens with respect to the edge of the lens, the focal length of the lens can be changed electronically, which, in turn, changes the directivity gain of the antenna 12.

The antennas 12 provide electronic steering which is sufficiently accurate to implement a practical gain variation in the 42 dB to 45 dB regime. For example, changing the radius of a radiation pattern by 200 meters at a range of 1200 kilometers requires a time delay control of 4 picoseconds for a 45 dB gain antenna array with dimensions of 1.2 meters on a side. Active lens control for the 42 to 45 dB range (in a 20/30 GHz system) requires time delays on the order of 4 picoseconds to 35 picoseconds.

The active lens 18 can be constructed using one of two techniques. The first, which is depicted in FIG. 7, utilizes a conventional lens that includes many pairs of receive and transmit antennas that are each connected in series with an active time delay network. The second technique, which comprises the preferred embodiment of the invention, is a time delay circuit 22 exhibited in FIG. 8. This circuit 22 includes a feed 24 coupled to a time delay steered array 25 which comprises a series of switches 26, time delay paths 28, transmission lines 29 and amplifiers 30. The time delay steered array 25 is connected to the time delay active lens 18 and to radiating elements 20.

The switched time delay networks 16 in the corporate feed accomplish beam steering functions. The time delay networks 16 can be adjusted for either fine gain beam steering (a few degrees) or for changing the directivity gain of the antenna (focal length of the lens).

Every satellite controls the assignment of channels to terminals requesting services. When a terminal has more than one satellite in view, the satellites monitor the signal quality and select which one is best suited to handle the call to the terminal. The receive beam from the ground terminal lags the transmit beam emitted from the satellite by a fixed interval. The terminal transmits its data to the satellite at a delay specified by the satellite in its preceding scan. This method is used to compensate for delay differences caused by variations in path lengths. The scan pattern among beams is coordinated to insure that all cells being scanned at one instant are separated by sufficient distance to eliminate interference among many closely-spaced customers. An electronic pushbroom carries the beams through one beam position in the direction of satellite travel, and then performs a flyback. Each beam carries a pilot tone which identifies each beam for terrestrial terminals. Components on board each satellite measure time delay and Doppler shift of each subscriber signal to determine the location of the subscriber within a particular beam footprint. Because the satellite antennas operate at a relatively high gain, the footprints on the ground are relatively small. Since the cells are small and the satellite footprint moves rapidly over the Earth's surface, any particular terminal remains in the same cell for only a few seconds. To avoid the rapid handoff from satellite to satellite every few seconds, an innovative logical/physical cell mapping scheme is utilized in conjunction with the present invention. For details about this novel technique, please refer to the copending patent application by Patterson and Sturza entitled *Earth-Fixed Cell Beam Management for Satellite Communication System*, which is cross-noted above.

II. Deployable, Folding Antenna Panels

FIG. 9 is a perspective schematic view of another of the satellite embodiments 34 that may be utilized in accordance with the present invention. The satellite (or spacecraft) 34 is shown in Earth orbit as seen from the ground. The spacecraft 34 comprises an antenna array which forms its central body 36 and two solar panels 38 extending away from the body 36. The body 36 includes articulated arms 40 made up of individual non-reflecting structural support panels panels 41, connected by hinges, that all extend away from a central plate 39. The articulated arms 40 are shown in a fully deployed position with the panels 41 rotated about their respective hinge lines. The panels 41 are locked into a position which is registered in a line of sight region, in respect of the surface of the Earth E, that is defined by a predetermined mask angle. Precision stops on each hinge provide the registration surfaces.

FIG. 10 depicts the satellite exhibited in FIG. 9 in its folded or stowed configuration package 42. This stowed configuration package 42 resembles a stack of relatively thin octagonal layers, the perimeter of which represents an octagon inscribed in the inside diameter of the launch vehicle stowage container. Several stowed configuration packages 42 are intended to be stacked one on top of another within a launch vehicle stowage container. In one of the preferred embodiments of the invention, the folded packages 42 fit within a 4.4 meter launch vehicle payload envelope. Given this constraint, and assuming that the panels 41 are approximately 5 inches thick, the folded configuration 42 occupies only about 35 inches of space. If a Titan IV rocket is used to lift these satellites into orbit, its 18.3 meter long shroud could carry about twenty satellites 34 at a time.

FIG. 11 reveals the stowed configuration 42 of the satellite displayed in FIG. 10, but with its upper and lower panels 41c, 41f removed to reveal an octagonal bus 44. The bus 44 protrudes from both sides of the central plate 39. Four of the articulated arms 40 fold down like an accordion on each side of the central plate 39. The four largest panels 41c, 41f (removed in FIG. 11) on each side overlap the top and bottom of the bus 44. The thickness of the bus 44 is the same as that of the two smaller panels 41a, 41b on each side of the central plate 39. In this embodiment, the bus volume is about 52 cubic feet.

FIGS. 12, 13 and 14 depict the method of hinged attachment and stowage of the articulated arms 40 and their constituent panels 41. FIG. 12 is a side elevation depicting the stowed satellite 42 configured so that one-half of its articulated arms 40a containing panels 41a, b, c are stowed against the obverse side O of the central plate 39 and one-half of its articulated arms 40b containing panels 41d, e, f are stowed against the reverse side R of the central plate 39. In this embodiment, each articulated arm 40 includes three panels 41. Other embodiments may included four or more panels 41, the last panel 41 in the group is identified as the ith panel. The total depth d of the stowed panels 41d, e, f which make up the articulated arm 40a in this embodiment, is three times the thickness t of one panel 41. The total depth of the panels 41a, b, c which make up the upper articulated arm 40a in this embodiment, is three times the thickness t of one panel 41. This, of course, is the minimum depth achievable for a given weight of satellite 42 and a given diameter of the stowage container aboard the launch vehicle. The panels 41 are connected to each other and to the central plate 39 by a plurality of hinges 43. To prevent mechanical interference between the articulated arms 40 in their stowed and deployed positions, each one of the articulated arms 40 is displaced from adjacent articulated arms 40 by one side SD of the octagonal central plate 39 and stowed alternately against the obverse side O and reverse side R. This is depicted more clearly in FIG. 15 which shows the articulated arms 40 in the process of unfolding to their deployed positions.

FIG. 13 shows another embodiment in which all the articulated arms 40 are stowed on the same side of the central plate 39. A first set of articulated arms 40a is hinged to the central plate 39 and fold down against the obverse side O of the central plate 39. A second set of articulated arms 40b folds down upon the first set 40a. To achieve this, the second set of articulated arms 40b is displaced from the first set of articulated arms 40a by one side SD of the octagonal central plate 39 and is connected to the central plate 39 by stand-offs 45. As described above, the panels 41 are locked into a position which is registered in a line of sight region, in respect of the surface of the Earth E, that is defined by a predetermined mask angle. This produces similar antenna beam coverage as shown in FIG. 3 for the hemispheric antenna array 10 with hexagonal antenna facets 12. Precision stops on each hinge 43 provide the registration surfaces.

FIG. 14 is a partial plan view of the satellite showing a typical articulated arm, containing i panels, in its deployed configuration. Reference to FIG. 14 will also aid in understanding the scheme for determining the planform areas of each panel. A first panel 41a is connected to the central plate 39 at a first hinge line h1. The first hinge line h1 is connected to the central plate 39 at a side S. The first hinge line h1 represents one side of the first panel 41a. The rest of the planform of the first panel 41a is described by constructing two perpendiculars P1, P2, lying in the plane of the central plate 39, at each end of the first hinge line h1. These perpendiculars P1, P2 represent two opposite sides of the first panel 41a. A second line is created near the center of the central plate 39 parallel to the first hinge line h1 and tangent to the bus 44. Some clearance is allowed for the bus 44. This line represents the position of a second hinge line h2 when the first panel 41a is stowed against the obverse side O of the central plate 39. The two perpendiculars P1, P2 are extended toward the center C of the central plate 39 and intersect with the second line, completing a closed rectangle which is the planform of the first panel 41a. It should be noted that it is possible, if necessary, to have a planform slightly larger than the rectangle just described without creating a mechanical interference when deployed with an adjacent articulated arm 40. Deployment of articulated arms 40 takes place sequentially to prevent such interference during unfolding.

FIG. 14 further shows how the planforms for panels 41b through 41i are determined. The planform for a second panel 41b can be seen as the area lying between the second hinge line h2 when in its stowed position on the face of the central panel 39, a third hinge line h3, which in its stowed position overlays the first hinge line h1, a first adjacent side S1 of the central plate 39, a second adjacent side S2 of the central plate 39, a first perpendicular bisector B1 which is constructed from the first adjacent side S1 and a second perpendicular bisector B2 constructed from the second adjacent side S2. The two perpendicular bisectors B1, B2 are extended from their respective adjacent sides S1, S2 toward the center C of the central plate 39 until they intersect the second hinge line h2 in its stowed position. The planforms for each successive panel beginning with a third panel 41c and continuing to a panel numbered i−1 are determined in a similar manner as the planform for the second panel 41b. The planform for the last or ith panel 41i may be seen as the area lying between the ith hinge line hi, the first adjacent side S1, the second adjacent side S2 and the two perpendicular bisectors B1, B2 extended from their respective adjacent sides S1, S2 to the center C of the central plate 39.

FIG. 15 is a schematic diagram 46 which illustrates the satellite as it unfolds from its stowed configuration to its orbital configuration. Articulating arms 40a are shown as deployed from their stowed position on the obverse side of the central plate 39 and articulating arms 40b are shown unfolding from their stowed position on the reverse side of the central plate 39.

FIG. 16 is a detailed presentation 48 of the unfolded panels 40. The spacecraft bus 44 is seen in its position relative to the deployed articulating arms 40. FIGS. 17, 18, and 19 supply additional side perspective and bottom views 50, 52, and 53 of the unfolded panels. In FIGS. 17 and 18, alternative shapes are shown for the first and second panels 41a, 41b, which provide for redistributed area.

FIG. 20 is a perspective view of the satellite in its stowed configuration showing smaller, inter-satellite link (ISL) antenna panels 41d at the top of the stack. This embodiment comprises articulating arms 40 having four antenna panels 41a-d each. The inter-satellite link antennas are registered in a direction facing satellites in the same or adjacent orbits. In this embodiment, four fixed and two electronically steerable antennas are used on each satellite for the ISL links. The link antennas as shown in this embodiment have truncated sides illustrating a reduced area of the panel.

FIG. 21 is a side view of the orbital configuration 34 with the solar panels 38 fully extended and the panels 41, including the smaller inter-satellite link antenna panels 41d, deployed. FIGS. 22, 23, 24, 25 and 26 comprise a series of views that illustrate the satellite 34 at various stages of deployment.

FIG. 27 is a view of the satellite body 36 together with a series of protruding inter-satellite link antennas 56 mounted to the central plate instead of appended to the articulated arms. FIG. 28 furnishes a view 58 of the panels that also shows the deployment pattern of antenna elements, while FIGS. 29, 30 and 31 provide more detailed views of the antenna elements. FIGS. 32, 33, 34 and 35 furnish enlarged views of smaller groups of panels bearing the antenna elements. FIGS. 36 and 37 are schematic illustrations that show the panels and central plate covered by antennas 32.

FIG. 38 is a schematic plot 60 of the lines-of-sight of beams generated by the antenna elements, typical for each panel 41. As previously mentioned, precision stops on each hinge 43 provide the registration surfaces which align the panels when deployed so the desired coverage of the Earth's surface is achieved. It should be noted that while the panels depicted in FIG. 38 are arranged in a concave, hemispherical configuration with respect to the Zenith, they may also be arranged in a convex hemispherical configuration with respect to the Zenith.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about one preferred embodiment, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

FIG. 1
  10 Spacecraft antenna array
  12 Hexagonal antenna facets
  E Earth direction
  P Solar panels
  S Satellite
  Z Zenith direction FIGS. 2 & 3
  10 Spacecraft antenna array
  11a Radio beams transmitted and received by antenna facets
  11b Radio beams transmitted and received by antenna facets
  11c Radio beams transmitted and received by antenna facets
  12 Hexagonal antenna facets
  14a Beam footprints on Earth surface
  14b Beam footprints on Earth surface
  14c Beam footprints on Earth surface
  E Earth
  F Fixed terminal
  G Gateway
  M Mobile terminal
  P Solar panels
  PT Portable Terminal
  S Satellite
  Z Zenith FIGS. 4 & 5
  E Earth
  S Satellites
  Z Zenith FIGS. 6, 7 & 8
  16 GaAs MMIC time delay network
  18 Active lens 20 Radiating elements
22 Time delay circuit
24 Feed
25 Time delay steered array
26 Switch
28 Time delay path
29 Transmission lines
30 Amplifier
32 Antenna
FIGS. 9 through 39
32 Antenna
34 Second embodiment of satellite
36 Satellite body
38 Solar panels
39 Central plate
40a–b Articulated arms
41a–i Panels
42 Stowed configuration
43 Hinge
44 Bus
45 Standoff
46 View of unfolding package
48 View of unfolded package
50 Perspective view of unfolded alternative package
52 Bottom view of unfolded alternative package
53 Bottom view of unfolded package
56 Inter-satellite link antennas
58 Schematic diagram of satellite body covered with numbered antenna elements
60 Plot of lines-of-sight for beams generated by antenna elements
B1 First perpendicular bisector
B2 Second perpendicular bisector
C Center of central plate
D Stowage Container Diameter
H Stowage Container Height
O Obverse side of central plate
P1 First perpendicular to hinge line
P2 Second perpendicular to hinge line
R Reverse side of central plate
SD One of n sides of central plate
S1 First adjacent side of central plate
S2 Second adjacent side of central plate
d Thickness of folded stack of articulated arms
t Thickness of panels
$h_1$–$h_i$ Hinge lines

What is claimed is:

1. A deployable, folding satellite antenna panel apparatus capable of being carried aboard a launch vehicle stowage container, said stowage container having a diameter (D) and a depth (H), said deployable, folding satellite antenna panel apparatus comprising:

a central plate (39) having a polygon shape having n sides (SD), n being an integer divisible by 2, and a center (C); said central plate (39) having a first adjacent side (S1) and a second adjacent side (S2) with reference to each one of said n sides (SD); said central plate (39) having an obverse side (O) and a reverse side (R) and having a planform, peripheral outline determined by inscribing said polygon shape within said stowage container diameter (D); and a plurality of articulated arms (40) having a plurality of non-reflecting, structural support panels (41) for actively transmitting and receiving radio signals; said non-reflecting, structural support panels (41) being stowed in layers in an accordion fold, upon said central plate (39), each one of said plurality of non-reflecting, structural support panels (41) having a hinge (43) along an edge by which each of said plurality of non-reflecting, structural support panels (41) is joined to another and to said central plate (39), each of said plurality of non-reflecting, structural support panels (41) having a thickness (t) and having a plurality of devices disposed thereon, including a plurality of discrete antennas (32);

said articulated arms (40) being the same in number as the number of said n sides (SD); each one of said articulated arms (40) being separately deployable in a radial direction from said center (C);

said plurality of articulated arms (40) when positioned by rotation about said hinge (43) into said accordion fold, being stowed on both said obverse side (O) and said reverse side (R) of said central plate (39) in an absolute minimum axial distance (d) determined only by the aggregate of said thickness (t), which maximizes surface area of said plurality of panels (41) for a given satellite weight and said launch vehicle stowage container diameter (D) and depth (H).

2. The apparatus as claimed in claim 1 in which each said hinge (43) registers each of said plurality of non-reflecting, structural support panels (41) in a line of sight region in respect of the surface of the Earth (E) that is defined by a predetermined mask angle, when said articulated arms (40) are deployed.

3. The apparatus as claimed in claim 1 in which said plurality of articulated arms (40) assume an oblate, hemispherical configuration when fully deployed.

4. The apparatus as claimed in claim 1 in which each one of said plurality of articulated arms (40) further comprises:

a first non-reflecting, structural support panel (41a); said first non-reflecting, structural support panel having a first hinge line (h1) coextensive with one of said n sides (SD) of said central plate (39) and a second hinge line (h2) parallel to said first hinge line (h1);

said first non-reflecting, structural support panel (41a) having a planform which is an area included between said first hinge line (h1), said second hinge line (h2), a first perpendicular (P1) erected to said first hinge line (h1) at an intersection with said first adjacent side (S1), a second perpendicular (P2) erected to said first hinge line (h1) at an intersection with said second adjacent side (S2), a first perpendicular bisector (B1) of said first adjacent side (S1), and a second perpendicular bisector (B2) of said second adjacent side (S2);

said first perpendicular bisector (B1) and said second perpendicular bisector (B2) each extended until it intersects said center (C); said second hinge line (h2) intersecting each said perpendicular bisector (B1, B2) when said one of said plurality of articulated arms (40) is in a stowed position;

a second non-reflecting, structural support panel (41b) hinged to said first non-reflecting, structural sunport panel at said second hinge line (h2); said second non-reflecting, structural support panel (41b) having a planform which is an area included between said first hinge line (h1), said second hinge line (h2) when in its stowed position, said first adjacent side (S1), said second adjacent side (S2), said first perpendicular bisector (B1) and said second perpendicular bisector (B2); and a third non-reflecting, structural support panel (41c) hinged to said second non-reflecting, structural support panel at a third hinge line (h3), said third hinge line (h3)

overlying said first hinge line (h1) when said plurality of non-reflecting, structural support panels (41) are stowed in said layers; said third non-reflecting, structural support panel (41c) having a planform area which is an area included between said third hinge line (h3), said first adjacent side (S1), said second adjacent side (S2), said first perpendicular bisector (B1) and said second perpendicular bisector (B2).

5. The satellite antenna apparatus as claimed in claim 3 in which said oblate, hemispherical configuration is convex in respect of a direction along the Zenith (Z) toward the Earth (E).

6. The satellite antenna apparatus as claimed in claim 3 in which said oblate, hemispherical configuration is concave in respect of a direction along the Zenith (Z) toward the Earth (E).

7. The apparatus as claimed in claim 3 in which said plurality of articulated arms (40) include non-reflecting, structural support panels (41d) for communicating directly between satellites (S).

8. The apparatus as claimed in claim 4 in which each one of said articulated arms (40) further comprises:

a plurality of additional non-reflecting, structural support panels (41i) numbered fourth through ith; said ith panel (41i) being hinged to an i–1 panel, which is a preceding panel, at an ith hinge line; each one of said plurality of additional non-reflecting, structural support panels (41i), up to and including said ith panel (41i), being hinged to a said preceding panel at an ith hinge line (hi) in a similar manner as said second panel (41b) is hinged to said first panel (41a) at said second hinge line (h2) and said third panel (41c) is hinged to said second panel (41b) at said third hinge line (h3), respectively;

said fourth non-reflecting, structural support panel (41d) and each succeeding numbered panel, through a panel numbered i–1, having a planform including an area no greater than said planform area of said second panel (41b); said ith panel (41i) having a planform which is an area included between said ith hinge line (hi), said first adjacent side (S1), said second adjacent side (S2), said first perpendicular bisector (B1) and said second perpendicular bisector (B2).

9. The apparatus as claimed in claim 7 in which said plurality of discrete antennas (32) includes a plurality of fixed and electronically steerable antennas.

10. A method of constructing deployable, folding satellite antenna panels, capable of being carried aboard a launch vehicle stowage container, said stowage container having a diameter (D) and a depth (H), comprising the steps of:

providing a central plate (39), said central plate (39) having a polygon shape having n sides (SD), n being an integer divisible by two, and a center (C);

said central plate (39) having a first adjacent side (S1) and a second adjacent side (S2) with reference to each one of said n sides (SD);

said central plate (39) having an obverse side (O) and a reverse side (R) and having a planform, peripheral outline determined by inscribing said polygon shape within said stowage container diameter (D);

providing a plurality of articulated arms (40) joined to said central plate (39), the number of said articulated arms (40) being the same as the number of said n sides (SD) of said central plate (39);

each of said plurality of articulated arms (40) having a plurality of non-reflecting, structural support panels (41) for actively transmitting and receiving radio signals, each of said non-reflecting, structural support panels (41) having a thickness (t) and a hinge (43) along an edge by which each of said plurality of non-reflecting, structural support panels (41) is joined to another and to said central plate (39);

each of said non-reflecting, structural support panels (41) having disposed thereon a plurality of discrete antennas (32);

stowing upon both said obverse side (O) and said reverse side (R) of said central plate (39) in an absolute minimum axial distance (d) determined only by the aggregate of said thickness (t), said plurality of articulated arms (40), in layers in an accordion fold; and separately deploying each one of said articulated arms (40) in a radial direction from said center (C);

said method of stowing maximizing surface area of said plurality of panels (41) for a given satellite weight and said launch vehicle stowage container diameter (D) and depth (H).

* * * * *